US011629683B2

United States Patent
Oryoji et al.

(10) Patent No.: US 11,629,683 B2
(45) Date of Patent: Apr. 18, 2023

(54) INTERNAL COMBUSTION ENGINE CONTROL DEVICE

(71) Applicant: Hitachi Astemo, Ltd., Hitachinaka (JP)

(72) Inventors: Kazuhiro Oryoji, Tokyo (JP);
Yoshihiko Akagi, Hitachinaka (JP);
Takayasu Matsushita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 25 days.

(21) Appl. No.: 17/595,630

(22) PCT Filed: Jun. 9, 2020

(86) PCT No.: PCT/JP2020/022620
§ 371 (c)(1),
(2) Date: Nov. 19, 2021

(87) PCT Pub. No.: WO2020/255789
PCT Pub. Date: Dec. 24, 2020

(65) Prior Publication Data
US 2022/0268249 A1     Aug. 25, 2022

(30) Foreign Application Priority Data
Jun. 21, 2019   (JP) .............................. JP2019-115843

(51) Int. Cl.
*F02P 3/045*    (2006.01)
*F02P 5/15*     (2006.01)
*F02B 23/08*    (2006.01)

(52) U.S. Cl.
CPC ................ *F02P 5/15* (2013.01); *F02B 23/08* (2013.01)

(58) Field of Classification Search
CPC ..... F02P 3/045; F02P 3/05; F02P 17/12; F02P 2017/121
See application file for complete search history.

(56) References Cited

U.S. PATENT DOCUMENTS

| 2004/0181760 A1* | 9/2004 | Ismailov | ................ G06F 30/20 703/2 |
| 2005/0279867 A1* | 12/2005 | Ismailov | .............. F02M 59/366 239/585.1 |

(Continued)

FOREIGN PATENT DOCUMENTS

| JP | 2018-135786 A | 8/2018 |
| JP | 2018-200008 A | 12/2018 |

(Continued)

OTHER PUBLICATIONS

International Search Report (PCT/ISA/210) issued in PCT Application No. PCT/JP2020/022620 dated Sep. 29, 2020 with English translation (15 pages).

(Continued)

*Primary Examiner* — John Kwon
(74) *Attorney, Agent, or Firm* — Crowell & Moring LLP

(57) ABSTRACT

Provided is an internal combustion engine control device capable of reducing a measurement load and calculating a flow velocity around an ignition plug. The internal combustion engine control device includes an inter-gap voltage calculation unit 31 and a flow velocity calculation unit 32. The inter-gap voltage calculation unit 31 calculates a reference inter-gap voltage under a reference condition, based on a secondary current and in-cylinder pressure. The flow velocity calculation unit calculates the flow velocity of a gas around the ignition plug based on the reference inter-gap voltage.

15 Claims, 17 Drawing Sheets

(56) References Cited

U.S. PATENT DOCUMENTS

| | | | |
|---|---|---|---|
| 2010/0078000 A1* | 4/2010 | Sakamoto | F01N 3/10 60/299 |
| 2011/0303650 A1* | 12/2011 | Sakurai | F02P 19/025 219/263 |
| 2018/0238293 A1 | 8/2018 | Sayama et al. | |
| 2018/0372058 A1 | 12/2018 | Hagari | |
| 2020/0173417 A1 | 6/2020 | Maeda et al. | |
| 2022/0010762 A1* | 1/2022 | Oryoji | F02P 5/1523 |

FOREIGN PATENT DOCUMENTS

| | | |
|---|---|---|
| JP | 2019-7436 A | 1/2019 |
| WO | WO 2018/216153 A1 | 11/2018 |

OTHER PUBLICATIONS

Japanese-language Written Opinion (PCT/ISA/237) issued in PCT Application No. PCT/JP2020/022620 dated May 15, 2018 (eight (8) pages).

* cited by examiner

INTERNAL COMBUSTION ENGINE CONTROL DEVICE

TECHNICAL FIELD

The present invention relates to an internal combustion engine control device.

BACKGROUND ART

In order to improve fuel consumption performance of an automobile, it is important to reduce fuel consumption of an internal combustion engine. As a technique for reducing the fuel consumption, dilution combustion in which dilution is performed at a ratio between fuel and air, as compared with a stoichiometric mixing ratio (ideal mixing ratio), and then burning is performed is known as means for reducing a pump loss and a cooling loss. As another technique, there is a combustion method utilizing an exhaust gas recirculation (EGR) gas in which a portion of a combustion gas is brought back to an intake side to dilute an air-fuel mixture of fuel and air.

In order to reduce the fuel consumption, it is necessary to set an appropriate dilution degree of the air-fuel mixture in accordance with operation conditions. Furthermore, in order to realize combustion while avoiding misfire under a condition of a large dilution degree, that is, in a state where the air-fuel mixture is lean, the relative concentration of the fuel is small. Thus, it is necessary to increase the amount of discharge energy supplied from an ignition plug to the air-fuel mixture in a cylinder at the time of spark ignition.

In addition, in order to realize stable combustion under a condition of a large dilution degree, it is necessary to increase the turbulence intensity and the flow velocity of the air-fuel mixture in the cylinder of an internal combustion engine. However, if the turbulence intensity and the flow velocity increase, there is a possibility of an occurrence of misfire due to a phenomenon such as blowing-off of discharge in the ignition plug. Therefore, it is necessary to increase the amount of discharge energy supplied from the ignition plug to the air-fuel mixture in the cylinder at the time of spark ignition.

In order to prevent blowing-off of discharge due to an increase in the flow velocity, it is effective to detect the flow velocity around the ignition plug and control the discharge energy and the discharge current. As a technique for detecting the flow velocity around the ignition plug, for example, there is a technique disclosed in PTL 1.

PTL 1 discloses a technique including a secondary voltage detection unit that detects a secondary voltage being a voltage generated by a secondary coil, and a secondary voltage minimum-value calculation unit that calculates the minimum value of the secondary voltage during a discharge period. In the technique disclosed in PTL 1, the length of the discharge plasma is calculated based on the secondary voltage and the minimum value of the secondary voltage, and an in-cylinder flow velocity is calculated based on the temporal change of the length of the discharge plasma and the Coulomb force.

CITATION LIST

Patent Literature

PTL 1: JP 2019-007436 A

SUMMARY OF INVENTION

Technical Problem

However, in the technique disclosed in PTL 1, in order to calculate the flow velocity around the ignition plug, the secondary voltage of the coil is measured a plurality of times after discharge. Therefore, in order to calculate the flow velocity that changes from moment to moment, the technique disclosed in PTL 1 has problems that a large number of voltage measurement processes are required and a measurement load increases.

Considering the above problems, an object of the present invention is to provide an internal combustion engine control device capable of reducing a measurement load and calculating a flow velocity around an ignition plug.

Solution to Problem

In order to solve the above problems and achieve the object, an internal combustion engine control device controls an internal combustion engine including an ignition plug disposed in a hollow of a cylinder and an ignition coil for applying a voltage to the ignition plug. The internal combustion engine control device includes an inter-gap voltage calculation unit and a flow velocity calculation unit. The inter-gap voltage calculation unit calculates a reference inter-gap voltage that is a voltage between gaps of the ignition plug under a reference condition, based on a secondary current generated on a secondary side of the ignition coil and in-cylinder pressure that is pressure in the hollow of the cylinder. The flow velocity calculation unit calculates the flow velocity of a gas around the ignition plug based on the reference inter-gap voltage.

Advantageous Effects of Invention

According to the internal combustion engine control device having the above configuration, it is possible to reduce a measurement load and calculate a flow velocity around an ignition plug.

BRIEF DESCRIPTION OF DRAWINGS

FIGS. 17A and 17B illustrate a relation of a force acting on a distal end portion of a discharge path, in which FIG. 17A is a schematic diagram illustrating a state in which the discharge path extends and a diagram obtained by extracting a distal end portion from a cross section taken along line A-A' of the discharge path illustrated in FIG. 17A.

DESCRIPTION OF EMBODIMENTS

1. Embodiments

Figure 1:
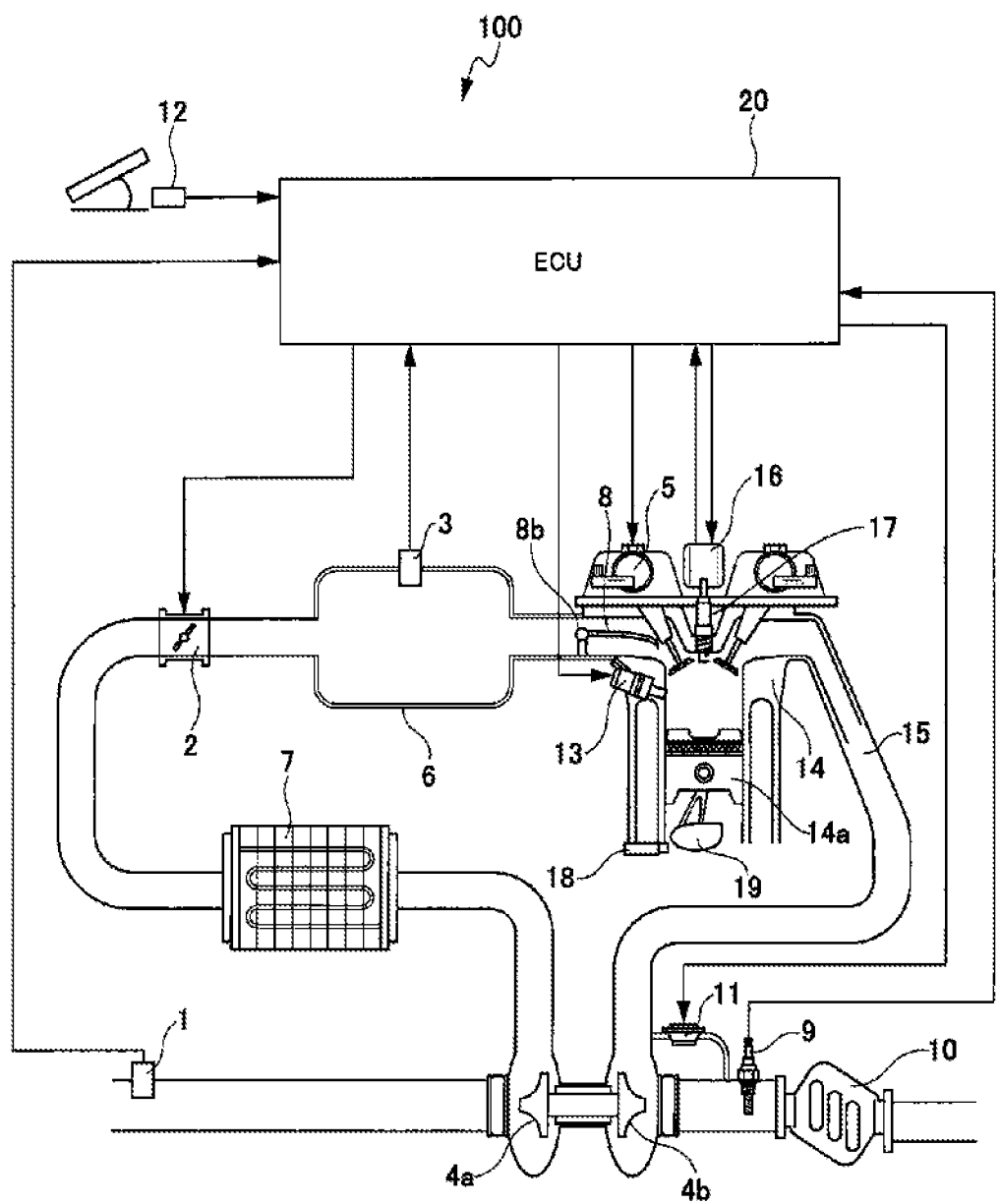
FIG. 1 is a schematic configuration diagram illustrating a system configuration of an internal combustion engine on which an internal combustion engine control device according to an embodiment is mounted.

An internal combustion engine control device according to an embodiment (referred to as "present example" below) will be described below with reference to FIGS. 1 to 21. In the drawings, the common members are denoted by the same reference signs.

1-1. Configuration Example of Internal Combustion Engine

First, a configuration example of an internal combustion engine will be described.

FIG. 1 is a schematic configuration diagram illustrating a system configuration of an internal combustion engine in the present example.

An internal combustion engine 100 illustrated in FIG. 1 is a cylinder injection type internal combustion engine (direct injection engine) that directly injects fuel made of gasoline into a cylinder. The internal combustion engine 100 is a four-cycle engine that repeats four strokes of an intake stroke, a compression stroke, a combustion (expansion) stroke, and an exhaust stroke. Furthermore, the internal combustion engine 100 is, for example, a multi-cylinder engine including four cylinders. The number of cylinders in the internal combustion engine 100 is not limited to four, and the internal combustion engine may include six cylinders or eight or more cylinders. The number of cycles of the internal combustion engine 100 is not limited to four cycles.

As illustrated in FIG. 1, the internal combustion engine 100 includes an air flow sensor 1, an electronically controlled throttle valve 2, an intake pressure sensor 3, a compressor 4a, an intercooler 7, and a cylinder 14. The air flow sensor 1, the electronically controlled throttle valve 2, the intake pressure sensor 3, the compressor 4a, and the intercooler 7 are disposed at positions up to the cylinder 14 in an intake pipe 6.

The air flow sensor 1 measures an intake air amount and an intake air temperature. The electronically controlled throttle valve 2 is driven to be openable and closable by a drive motor (not illustrated). The opening degree of the electronically controlled throttle valve 2 is adjusted based on an accelerator operation of a driver. Thus, the amount of air to be taken in is adjusted, and the pressure of the intake pipe is adjusted. The intake pressure sensor 3 measures the pressure of the intake pipe 6.

The compressor 4a is a supercharger that supercharges intake air. A rotational force is transmitted to the compressor 4a by a turbine 4b described later. The intercooler 7 is disposed on the upstream side of the cylinder 14 and cools the intake air.

The intake pipe 6 is provided with a partition wall 8 and a tumble control valve 8b that adjust the flow velocity and the flow of a gas flowing into the hollow of the cylinder 14. The partition wall 8 divides a flow path in the vicinity of the cylinder 14 in the intake pipe 6 into two paths. The tumble control valve 8b is disposed on one side of the flow path divided into two by the partition wall 8. Then, in a state where the tumble control valve 8b is opened, an intake gas taken in flows through the flow paths on both paths obtained by division of the partition wall 8. In a state where the tumble control valve 8b is closed, the flow path on one side divided by the partition wall 8 is closed, and the intake gas flows through the remaining flow path on one side. Thus, the flow velocity of the intake gas flowing in the hollow of the cylinder 14 increases. By controlling the degree of closing of the tumble control valve 8b, the flow velocity of the gas flowing in the cylinder 14 is controlled.

In the internal combustion engine 100, an injector 13 and an ignition device are provided for each cylinder 14. The injector 13 injects fuel into the cylinder 14. The ignition device includes an ignition coil 16 for supplying ignition energy and an ignition plug 17. The ignition coil 16 generates a high voltage under control of the internal combustion engine control device 20 and applies the generated voltage to the ignition plug 17. Thus, sparks are generated in the ignition plug 17. Then, the air-fuel mixture in the cylinder burns and explodes by the spark generated in the ignition plug 17.

A voltage sensor (not illustrated) is attached to the ignition coil 16. The voltage sensor measures a primary-side voltage or a secondary-side voltage of the ignition coil 16. The voltage information measured by the voltage sensor is transmitted to an internal combustion engine control device 20 which is an engine control unit (ECU).

A cylinder head of the cylinder 14 is provided with a variable valve 5. The variable valve 5 adjusts the air-fuel mixture flowing into the hollow of the cylinder 14 or the exhaust gas discharged from the cylinder. The intake amount and the internal EGR amount of all cylinders 14 are adjusted by adjusting the variable valve 5.

Further, a piston 14a is slidably disposed in the hollow of the cylinder 14. The piston 14a compresses the air-fuel mixture of the fuel and the gas flowing into the hollow of the cylinder 14. The piston 14a reciprocates in the hollow of the cylinder 14 by combustion pressure generated in the cylinder. A crank angle sensor 19 that detects the position of the piston 14a is attached.

The injector 13 injects fuel into the hollow of the cylinder 14 under the control of the internal combustion engine control device (ECU) 20 described later. Thus, an air-fuel mixture obtained by mixing fuel and air is generated in the hollow of the cylinder 14. A high-pressure fuel pump (not illustrated) is connected to the injector 13. Fuel having pressure that is increased by the high-pressure fuel pump is supplied to the injector 13. Further, a fuel pressure sensor that measures fuel injection pressure is provided in a fuel pipe connecting the injector 13 and the high-pressure fuel pump.

The cylinder 14 is provided with a temperature sensor 18. The temperature sensor 18 measures the temperature of a cooling water circulating the cylinder 14.

Furthermore, an exhaust pipe 15 is connected to an exhaust port of the cylinder 14. The exhaust pipe 15 is provided with a turbine 4b, an electronically controlled wastegate valve 11, a three-way catalyst 10, and an air-fuel ratio sensor 9. The turbine 4b rotates by an exhaust gas passing through the exhaust pipe 15, and transfers the rotational force to the compressor 4a. The electronically controlled wastegate valve 11 adjusts an exhaust flow path flowing to the turbine 4b.

The three-way catalyst 10 purifies harmful substances contained in the exhaust gas by an oxidation/reduction reaction. The air-fuel ratio sensor 9 is disposed on the upstream side of the three-way catalyst 10. The air-fuel ratio sensor 9 detects the air-fuel ratio of the exhaust gas passing through the exhaust pipe 15.

Signals detected by the respective sensors such as the air flow sensor 1, the intake pressure sensor 3, and the voltage sensor are transmitted to the internal combustion engine control device 20. A signal detected by an accelerator opening degree sensor 12 that detects the depression amount of an accelerator pedal, that is, the accelerator opening degree is also transmitted to the internal combustion engine control device 20.

The internal combustion engine control device 20 calculates the required torque based on the main signal of the accelerator opening degree sensor 12. That is, the accelerator opening degree sensor 12 is used as a required-torque detection sensor that detects the required torque for the internal combustion engine 100. In addition, the internal combustion engine control device 20 calculates the rotational speed of the internal combustion engine 100 based on an output signal of the crank angle sensor (not illustrated). The internal combustion engine control device 20 optimally calculates main operation amounts of the internal combustion engine 100, such as an air flow rate, a fuel injection amount, an ignition timing, and fuel pressure, based on an operation state of the internal combustion engine 100, which is obtained from outputs of the various sensors.

The fuel injection amount calculated by the internal combustion engine control device 20 is converted into a valve opening pulse signal and output to the injector 13. The ignition timing calculated by the internal combustion engine control device 20 is output to the ignition plug 17 as an ignition signal. Further, the throttle opening degree calculated by the internal combustion engine control device 20 is output to the electronically controlled throttle valve 2 as a throttle drive signal.

1-2. Configuration Example of Internal Combustion Engine Control Device 20

Next, a configuration example of the internal combustion engine control device 20 will be described with reference to FIG. 2.

Figure 2:
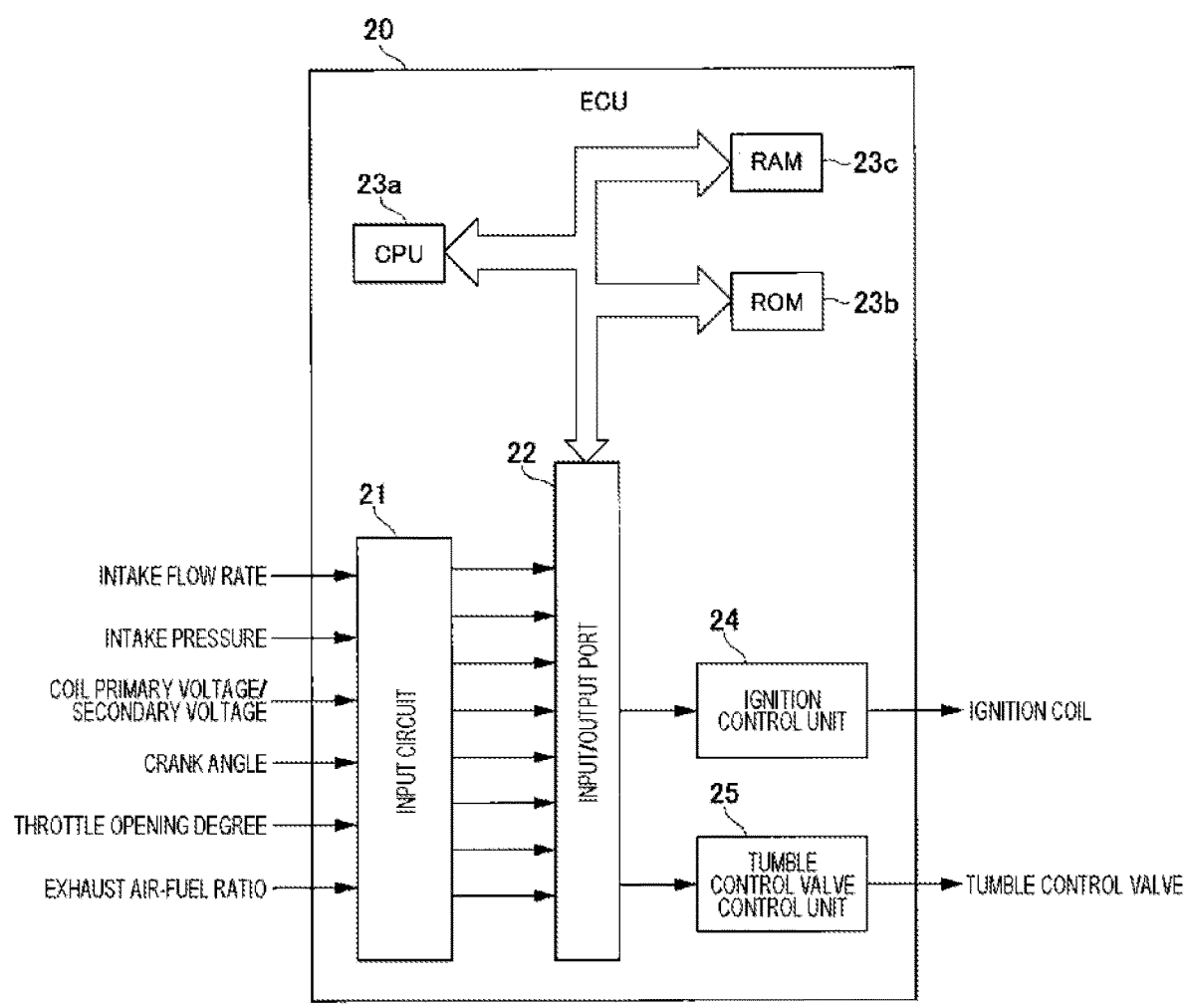
FIG. 2 is a block diagram illustrating a configuration of the internal combustion engine control device according to the embodiment.

FIG. 2 is a block diagram illustrating a configuration of the internal combustion engine control device 20.

As illustrated in FIG. 2, the internal combustion engine control device 20 which is an engine control unit (ECU) includes an input circuit 21, an input/output port 22, a random access memory (RAM) 23c, a read only memory (ROM) 23b, and a central processing unit (CPU) 23a. The internal combustion engine control device 20 further includes an ignition control unit 24 and a tumble-control-valve control unit 25.

The intake flow rate from the air flow sensor 1, the intake pressure from the intake pressure sensor 3, and the primary voltage or secondary voltage of the coil from the voltage sensor are input to the input circuit 21. Information measured by various sensors, such as a crank angle, a throttle opening degree, and an exhaust air-fuel ratio is also input to the input circuit 21.

The input circuit 21 performs signal processing such as noise removal on the input signal and transmits the resultants to the input/output port 22. The value input to the input port of the input/output port 22 is stored in the RAM 23c.

The ROM 23b stores a control program describing contents of various types of arithmetic processing performed by the CPU 23a, and a MAP, a data table, and the like used in each type of processing. The RAM 23c is provided with a storage area for storing the value input to the input port of the input/output port 22 and a value representing the operation amount of each actuator, which is calculated in accordance with the control program. The value representing the operation amount of each actuator, which is stored in the RAM 23c, is transmitted to the output port of the input/output port 22.

The ignition signal set in the output port of the input/output port 22 is transmitted to the ignition coil 16 via the ignition control unit 24. The ignition control unit 24 controls the energization timing and the energization time of the ignition coil 16. Further, the ignition control unit 24 performs discharge energy control in the ignition plug 17. A drive signal indicating the opening/closing amount of the tumble control valve 8b, which is set in the output port of the input/output port 22, is transmitted to the tumble control valve 8b via the tumble-control-valve control unit 25.

In the present example, an example in which the ignition control unit 24 and the tumble-control-valve control unit 25 are provided in the internal combustion engine control device 20 has been described, but the present invention is not limited thereto. For example, one of the ignition control unit 24 and the tumble-control-valve control unit 25, or all of the ignition control unit 24 and the tumble-control-valve control unit 25 may be mounted on a control device different from the internal combustion engine control device 20.

2. Configuration Example of Ignition Control Unit

2-1. First Embodiment

Next, a first embodiment of the ignition control unit will be described with reference to FIGS. 3 to 12.

Figure 3:
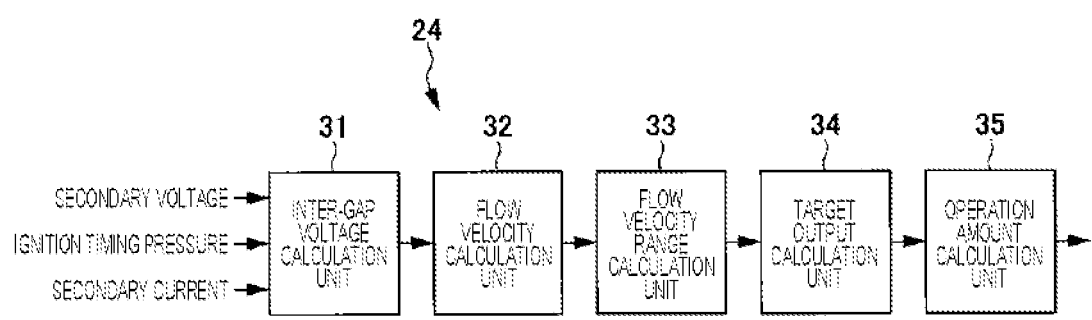
FIG. 3 is a control block diagram illustrating an outline of an ignition control unit according to a first embodiment.

FIG. 3 is a control block diagram illustrating an outline of discharge energy control in the ignition control unit.

As illustrated in FIG. 3, the ignition control unit 24 includes an inter-gap voltage calculation unit 31, a flow velocity calculation unit 32, a flow velocity range calculation unit 33, a target output calculation unit 34, and an operation amount calculation unit 35.

The inter-gap voltage calculation unit 31 obtains a voltage between a center electrode 17a and a ground electrode 17b (see FIG. 4) (referred to as an inter-gap below) of the ignition plug 17 based on the secondary voltage applied to the ignition coil 16, the secondary current, and the in-cylinder pressure that is the pressure in the hollow of the cylinder 4 at the ignition timing.

The inter-gap voltage calculation unit 31 obtains a voltage under a condition that the length of the discharge path formed between the gaps varies depending on the voltage generated by the ignition plug 17. The inter-gap voltage calculated by the inter-gap voltage calculation unit 31 is a reference inter-gap voltage and a post-discharge inter-gap voltage. The reference inter-gap voltage is an inter-gap voltage under a reference condition. The reference condition is, for example, a condition in which the length of the discharge path immediately after discharge is equal to the distance between the gaps, that is, a shortest discharge condition. The reference condition will be described below by using the shortest discharge condition.

The post-discharge inter-gap voltage is an inter-gap voltage after a setting time ti has elapsed after the discharge has been started. The inter-gap voltage calculation unit 31 outputs the calculated reference inter-gap voltage and post-discharge inter-gap voltage to the flow velocity calculation unit 32. A method of calculating the inter-gap voltage in the inter-gap voltage calculation unit 31 will be described later.

The flow velocity calculation unit 32 calculates the flow velocity of the gas around the ignition plug 17 based on the reference inter-gap voltage and the post-discharge inter-gap voltage calculated by the inter-gap voltage calculation unit 31. The flow velocity calculation unit 32 outputs the calculated flow velocity calculation value around the ignition plug 17 to the flow velocity range calculation unit 33. A method of calculating the flow velocity calculation value in the flow velocity calculation unit 32 will be described later.

The flow velocity range calculation unit 33 stores a flow velocity calculation value (referred to as a flow velocity below) calculated by the flow velocity calculation unit 32 by a predetermined number N of cycles. The flow velocity range calculation unit 33 calculates a maximum flow velocity value, an average flow velocity value, a flow velocity range, and a maximum-value update flag. The maximum flow velocity value is the maximum value among the flow velocities for the predetermined number N of cycles, which are stored by the flow velocity range calculation unit 33. The average flow velocity value is an average value of the flow velocities for the predetermined number N of cycles, which are stored by the flow velocity range calculation unit 33.

Furthermore, the flow velocity range is values from the minimum value to the maximum value of the flow velocity values for the predetermined number N of cycles, which are stored by the flow velocity range calculation unit 33. The maximum-value update flag is a flag indicating whether or not the maximum flow velocity value is updated. When the maximum flow velocity value is updated, the maximum-value update flag is set to True. When the maximum flow velocity value is not updated, the maximum-value update flag is set to False. The maximum flow velocity value, the average flow velocity value, and the flow velocity range calculated by the flow velocity range calculation unit 33, and the maximum-value update flag are input to the target output calculation unit 34.

The target output calculation unit 34 calculates a target value (target output) of the current and energy generated by the ignition coil 16, based on the maximum flow velocity value calculated by the flow velocity range calculation unit 33. The target output calculation unit 34 outputs the calculated target output to the operation amount calculation unit 35.

The operation amount calculation unit 35 calculates the operation amount of the ignition coil 16 for realizing the target output.

The operation amount calculated by the operation amount calculation unit 35 is, for example, an energization time to the primary side of the ignition coil 16.

[Temporal Change of State of Discharge Path and Distance between Electrodes]

Next, a temporal change of the state of the discharge path and the distance between the electrodes will be described with reference to FIGS. 4A and 4B.

Figure 4A:
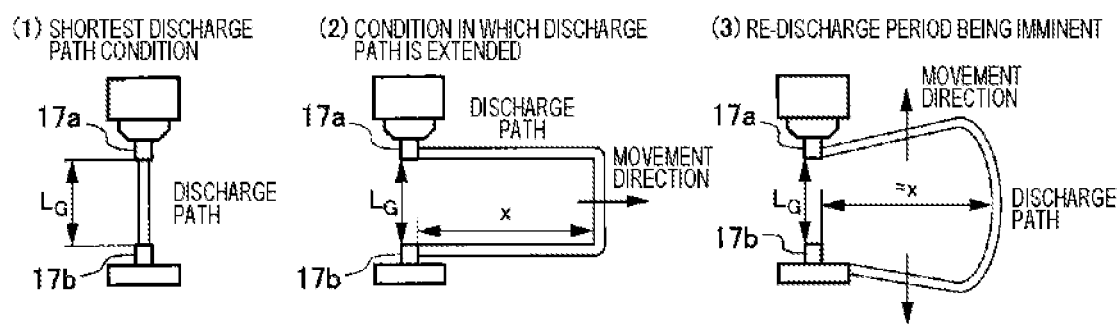
FIG. 4A is a schematic diagram illustrating a state of a discharge path.
Figure 4B:
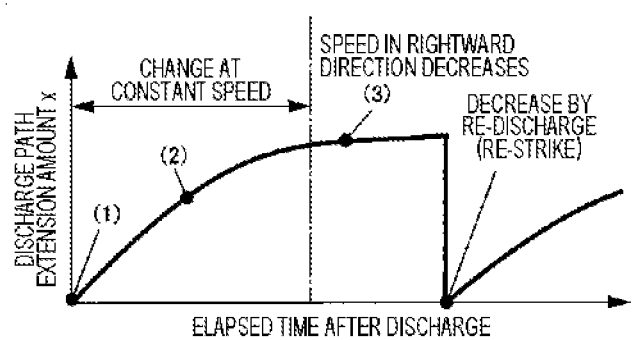
FIG. 4B is a graph showing a relation between an extension amount of the discharge path and an elapsed time.

FIG. 4A is a schematic diagram illustrating the state of the discharge path, and FIG. 4B is a graph showing a relation between an extension amount of the discharge path and an elapsed time. FIG. 4A illustrates (1) the shortest discharge condition, (2) a condition in which the discharge path is extended, and (3) a condition in which re-discharge is imminent. In FIG. 4B, a horizontal axis represents the elapsed time of discharge, and a vertical axis represents the extension amount of the discharge path.

As illustrated in FIG. 4A, in (1) the shortest discharge condition, the length of the discharge path is equal to the distance (so-called a gap distance) $L_G$[m] between the center electrode 17a and the ground electrode 17b of the ignition plug 17.

After the discharge is started, the discharge path is transferred by the flow of the gas around the ignition plug 17. Here, it is assumed that the gas flows in an orthogonal direction orthogonal to a facing direction in which the center electrode 17a and the ground electrode 17b face each other, and a transfer amount of the discharge path in the orthogonal direction is defined as a discharge path extension amount x[m]. In a certain time range after the discharge, it can be approximated that the deformation of the discharge path occurs only in the orthogonal direction. Therefore, the length $L_{SF}$[m] of the discharge path under the condition (2) in which the discharge path extends, illustrated in FIG. 4A, can be calculated by the following Expression 1.

$$L_{sp} = 2x + L_G \qquad \text{[Math. 1]}$$

As illustrated in FIG. 4B, in a predetermined time range after discharge, the slope of change in the discharge path extension amount x is constant. When the discharge path further extends, re-discharge (re-strike) occurs, and the discharge path is newly formed. As a result, the discharge path extension amount x decreases. As shown in the condition (3) in which re-discharge is imminent in FIG. 4A, the discharge path extends also in a direction different from the orthogonal direction.

This is because the flow of the gas passing between the gaps changes the direction in the facing direction, so that the flow velocity also includes a component in the facing direction. Therefore, under the condition (3) in which re-discharge is imminent, it is not possible to estimate the length of the discharge path from Expression 1.

In view of the above description, if the discharge path extension amount x (or the discharge path length) in a period in which the slop changes constantly is known, it is possible to calculate the flow velocity from the calculated discharge path extension amount (or the discharge path length) and the known (1) shortest discharge condition, that is, the discharge path length immediately after discharge (value equal to the gap distance).

Thus, it is possible to calculate the flow velocity by using only the voltage measurement value after the setting time ti has elapsed after discharge. As a result, it is possible to calculate the flow velocity by measuring the voltage once without performing the voltage measurement processing a plurality of times after the discharge, and thus it is possible to easily perform the calculation processing of the flow velocity.

It is difficult to use Expression 1 under the condition (3) in which re-discharge is imminent illustrated in FIGS. 4A and 4B. Thus, it is preferable to set the setting time ti before reaching the state (3) in which re-discharge is imminent.

[Method of Setting Setting Time ti]

Next, a method of setting the setting time ti will be described.

As the method of setting the setting time ti, for example, there are a setting method using a map that is constructed in advance by an experiment or a simulation and indicates the setting time ti after discharge, and a method of setting the setting time ti based on the detected speed.

Figure 5:
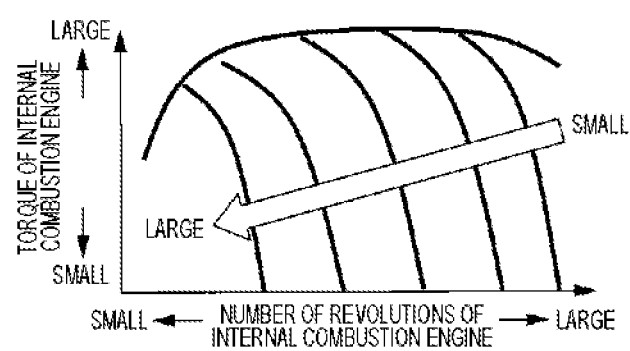
FIG. 5 is a diagram illustrating map data of a setting time after discharge.

FIG. 5 is a diagram illustrating map data of the setting time ti after discharge. In FIG. 5, a vertical axis represents the torque of the internal combustion engine, and a horizontal axis represents the number of revolutions in an internal combustion period.

Here, the time until reaching the state (3) in which re-discharge is imminent is influenced by the flow velocity around the ignition plug 17 and the followability to the flow of the discharge path. The followability to the flow of the discharge path refers to an index having a correlation with the magnitude of the relative speed generated between the movement speed of the discharge path and the flow velocity around the ignition plug 17. For example, the followability can be defined as a ratio C ($C=u_D/u_{air}$) between the flow velocity $u_{air}$ around the ignition plug 17 and the discharge path velocity $u_D$.

When the followability is defined by the ratio between the above two, the followability of 1 indicates that the flow velocity $u_{air}$ around the ignition plug 17 coincides with the movement speed $u_D$ of the discharge path. The followability that is smaller than 1 indicates that the movement speed $u_D$ of the discharge path is smaller (slower) than the flow velocity $u_{air}$ around the ignition plug 17. Furthermore, the flow velocity $u_{air}$ around the ignition plug 17 increases with an increase of as the rotational speed of the internal combustion engine 100. Furthermore, when the in-cylinder pressure of the cylinder 14 at the ignition timing is large, the followability increases. Therefore, the larger the number of revolutions, the shorter the time to reach the state (3) in which re-discharge is imminent. In addition, the larger the in-cylinder pressure of the cylinder 14 at the ignition timing, the shorter the time to reach the state (3) in which re-discharge is imminent.

As the torque of the internal combustion engine 100 increases, the in-cylinder pressure of the cylinder 14 at the ignition timing tends to increase. Therefore, when the setting time ti after discharge is set based on the torque and the number of revolutions of the internal combustion engine 100, as illustrated in FIG. 5, the setting time ti decreases as the number of revolutions increases. At the equal number of revolutions, the setting time ti decreases as the torque increases. Thus, it is possible to set the setting time ti in consideration of the time until reaching the state (3) in which re-discharge is imminent, which changes in accordance with the operation condition. Furthermore, it is possible to calculate the flow velocity around the ignition plug 17 by the setting time ti and to improve the calculation accuracy of the flow velocity.

Next, a method of setting the setting time ti based on the detected flow velocity will be described.

First, the flow velocity around the ignition plug 17 is calculated by a calculation method of the flow velocity, which will be described later. Then, an average flow velocity value $u_{ave}$ [m/s] is calculated from flow velocity values for a predetermined number N of cycles. The average flow velocity value $u_{ave}$ will be described later. The setting time ti is calculated from the calculated average flow velocity value $u_{ave}$, a reference value $x_{ref}$ [m] of the discharge path extension amount, and the following Expression 2. The reference value $x_{ref}$ of the discharge path extension amount is set in advance, based on an experiment or a simulation.

$$t_i = \frac{x_{ref}}{u_{ave}} \qquad \text{[Math. 2]}$$

As shown in Expression 2, by setting the setting time ti based on the average flow velocity value $u_{ave}$ calculated by the flow velocity calculation unit 32, it is possible to set an appropriate setting time ti reflecting individual variations and aging of the internal combustion engine 100. In addition, it is possible to update the setting time ti based on the latest information. As a result, it is possible to reduce an error in the flow velocity calculation caused by individual variations and aging.

[Calculation Operation of Inter-Gap Voltage]

Next, a calculation operation of the inter-gap voltage in the inter-gap voltage calculation unit 31 will be described with reference to FIGS. 6 and 7.

Figure 6:
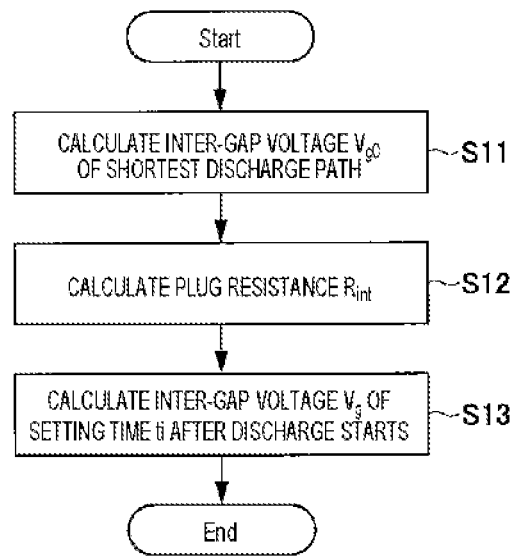
FIG. 6 is a flowchart illustrating a calculation operation of an inter-gap voltage in an inter-gap voltage calculation unit according to the first embodiment.

FIG. 6 is a flowchart illustrating the calculation operation of the inter-gap voltage in the inter-gap voltage calculation unit 31.

As illustrated in FIG. 6, first, the inter-gap voltage calculation unit 31 calculates an inter-gap voltage in the shortest discharge path, that is, a reference inter-gap voltage $V_{g0}$ [V] (Step S11). The reference inter-gap voltage $V_{g0}$ can be calculated by using an expression (Kim J. & Anderson R. W. (1995) Spark anemometry of bulk gasvelocity at the plug gap of a firing engine (No. 952459). SAE Technical Paper) of Kim and Anderson, which is represented by the following Expression 3.

$$V_g = 4.0 \times 10^4 \left(\frac{p}{p_0}\right)^{0.51} I_s^{-0.32} L_{sp} \qquad \text{[Math. 3]}$$

Here, p is the in-cylinder pressure [Pa] at the ignition timing, $p_0$ is the reference pressure ($1\times10^5$) [Pa], and $I_s$ is the secondary current [A]. The in-cylinder pressure p changes in accordance with the operation condition of the internal combustion engine 100. The reference inter-gap voltage $V_{g0}$ is calculated by the following Expression 4 in a manner that the discharge path length $L_{sp}$ in Expression 3 is substituted with the inter-gap distance $L_G$ that is the length of the discharge path under the shortest discharge path condition.

$$V_{g0} = 4.0 \times 10^4 \left(\frac{p}{p_0}\right)^{0.51} I_s^{-0.32} L_G \qquad \text{[Math. 4]}$$

In order to calculate the reference inter-gap voltage $V_{g0}$ using Equation 4, the in-cylinder pressure p at the ignition timing and the secondary current $I_s$ are required. As the in-cylinder pressure p, a measurement value of the in-cylinder pressure sensor can be used. The in-cylinder pressure p may be calculated from the following Expression 5 based on the intake pressure detected by the intake pressure sensor 3, the in-cylinder volume at a timing when the intake valve is closed, and the in-cylinder volume at the ignition timing.

$$p = p_{int}\left(\frac{V_{ivc}}{V_{adv}}\right)^{\gamma} \qquad \text{[Math. 5]}$$

Here, $p_{int}$ is the intake pressure [Pa], and $V_{ivc}$ is the in-cylinder volume [m³] at the timing when the intake valve is closed. $V_{adv}$ is the in-cylinder volume [m³] of the ignition timing, and $\gamma$ is the specific heat ratio. In a stoichiometric mixing condition, the specific heat ratio can be set to about 1.33.

The method of calculating the in-cylinder pressure p is not limited to the above-described example. Map data of the pressure at the ignition timing, using a map in which the number of revolutions and the torque of the internal combustion engine are used as axes, may be created in advance, and then the in-cylinder pressure p may be set from the map data. Thus, it is possible to calculate the in-cylinder pressure p necessary for calculating the flow velocity without using the in-cylinder pressure sensor.

Figure 7:
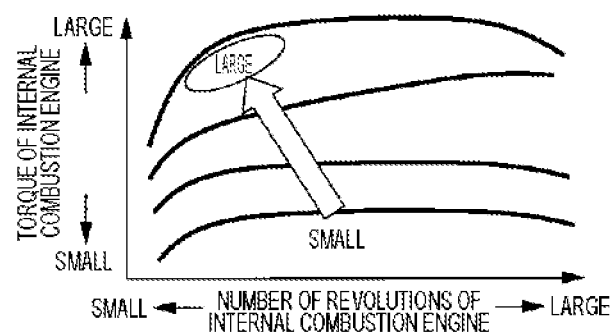
FIG. 7 is a diagram illustrating map data of in-cylinder pressure.

FIG. 7 is a diagram illustrating the map data of the in-cylinder pressure p. In FIG. 7, a vertical axis represents the torque of the internal combustion engine, and a horizontal axis represents the number of revolutions in an internal combustion period.

As illustrated in FIG. 7, qualitatively, the in-cylinder pressure p at the ignition timing increases under a condition in which the torque is large and a condition where the ignition timing is close to the top dead center. The torque is calculated based on the intake air amount and the throttle opening degree, and the number of revolutions is calculated based on the measurement value of the crank angle sensor 19.

As the secondary current $I_s$ included in Expression 3, a secondary current at the setting time ti after discharge is used. As the secondary current, for example, a value measured by a current sensor installed on the secondary side of the ignition coil 16 can be applied.

The method of setting the secondary current $I_s$ is not limited to the example using the current sensor.

For example, a relation between a period (primary-side energization time) of energization to the primary side of the ignition coil 16 and the secondary current at the setting time ti after discharge may be stored in advance, and then the secondary current $I_s$ may be set from this relation.

Figure 8:
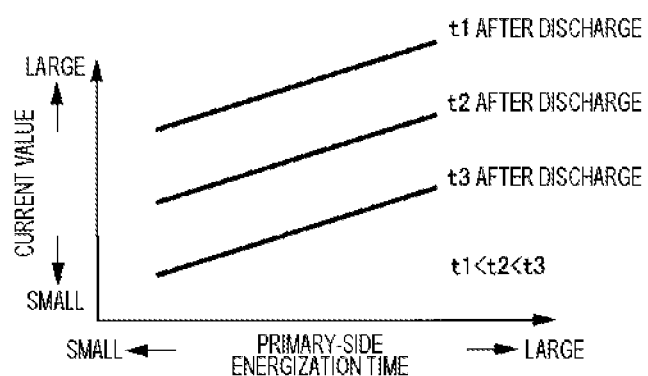
FIG. 8 is a diagram illustrating a relation between a primary-side energization time and a secondary current at a setting time after discharge.

FIG. 8 is a diagram illustrating a relation between a primary-side energization time and the secondary current at the setting time ti after discharge.

As illustrated in FIG. 8, when the setting time ti after discharge is constant, the value of the secondary current at the setting time ti after discharge increases as the primary-side energization time increases. When the time of the setting time ti after discharge changes to t1, t2, and t3 (t1<t2<t3), the value of the secondary current at the setting time ti after discharge decreases as the time of the setting time ti after discharge increases. The primary-side energization time is stored, for example, in a memory such as the ROM 23b as the operation amount for the ignition coil 16 that is an ignition device.

As described above, by creating the map data in advance, it is possible to set the secondary current $I_s$ necessary for calculating the flow velocity without providing a current sensor, and to reduce the number of components.

The mathematical expressions for calculating the reference inter-gap voltage $V_{g0}$ are not limited to Expressions 3 and 4, and a mathematical expression for calculating the inter-gap voltage constructed by a designer may be used.

In this manner, by setting the reference inter-gap voltage $V_{g0}$ necessary for calculating the flow velocity by calculation, it is not necessary to measure the inter-gap voltage of the ignition plug 17 under the reference condition. As a result, it is possible to reduce the measurement load at the time of calculating the flow velocity. Furthermore, by setting the secondary current $I_s$ and the in-cylinder pressure p necessary for calculating the reference inter-gap voltage $V_{g0}$ based on the map data created in advance and the intake air pressure, it is possible to calculate the flow velocity without providing a new sensor.

When the calculation processing of the reference inter-gap voltage $V_{g0}$ is completed, the inter-gap voltage calculation unit 31 calculates plug resistance $R_{int}$ [Ω] (Step S12). The plug resistance $R_{int}$ corresponds to the sum of the resistance connected to the secondary side in the ignition coil 16 and the resistance of the ignition plug 17. Since the resistance of the ignition plug 17 is larger than the resistance in the ignition coil 16, the plug resistance $R_{int}$ can be mainly obtained by the resistance of the ignition plug 17.

Depending on the current range in which the ignition plug is energized, the maximum specification voltage of the resistor may be exceeded. In such a case, there is a possibility that the resistance value is smaller than the set value of an internal resistance of the ignition plug or the single measurement value of the ignition plug 17. Such a decrease in the resistance value can be represented by the following Expression 6.

$$R_{int} = \max(R_{int,0} - r_{int}(I_s - I_{s,ref}), R_{int,lim})(I_s > I_{s,ref}) \qquad \text{[Math. 6]}$$

Here, $R_{int,\,0}$ is an installation value of the internal resistance of the ignition plug 17 or a single measurement value [Ω]. Further, $r_{int}$ is a change rate [Ω/A] of the internal resistance by the current. $I_{s,\,ref}$ is the minimum value of a current value at which the internal resistance becomes smaller than the design value. $R_{int,\,lim}$ is a lower limit value [Ω] of the internal resistance. The change rate $r_{int}$ of the internal resistance, the minimum value $I_{s,\,ref}$ of the current value at which the internal resistance becomes smaller than the installation value, and the lower limit value $R_{int,\,lim}$ of the internal resistance are measured in advance by an experiment and are stored in, for example, the ROM 23b.

As described above, by considering in advance the change in the internal resistance by the current value, it is possible to prevent the value from becoming negative when the post-discharge inter-gap voltage, which is the inter-gap voltage after the setting time ti has elapsed after the discharge, which will be described later, is calculated.

The ratio of the voltage between the electrodes, which is indicated by the voltage on the secondary side, increases under the condition that discharge path is largely extended. Therefore, it can be approximated that the secondary voltage is equal to the voltage between the electrodes. Thus, the value of the plug resistance $R_{int}$ may be approximated to 0 [Ω]. As described above, by setting the internal resistance to 0, it is possible to calculate the flow velocity without forming a model of the internal resistance as shown in Expression 6, when the post-discharge inter-gap voltage is calculated using the change in the internal resistance by the current.

In addition, it is possible to prevent the value of the flow velocity from becoming negative.

When the calculation processing of the plug resistance $R_{int}$ is completed, the inter-gap voltage calculation unit 31 calculates the inter-gap voltage in the state where the discharge path extends, that is, the post-discharge inter-gap voltage $V_g$, based on the measurement value at the setting time ti after discharge (Step S13). The post-discharge inter-gap voltage $V_g$ is obtained by the following Equation 7.

$$V_g = V_s - R_{int} I_s \quad \text{[Math. 7]}$$

Here, $V_s$ is the secondary voltage [V]. As the secondary voltage $V_s$, a value measured by a voltage sensor connected to the ignition coil 16 may be used. As described above, by calculating the post-discharge inter-gap voltage $V_g$ based on the measurement value, it is possible to accurately calculate the inter-gap voltage in consideration of the extension of the discharge path, and to improve the accuracy in the calculation processing of the flow velocity described later.

The secondary voltage $V_s$ may be calculated using the voltage measured on the primary side and the turn ratio between the primary side and the secondary side in the ignition coil 16. For example, when the primary-side voltage Vp [V] of the ignition coil 16 is measured, the secondary voltage $V_s$ is calculated from the following Expression 8.

$$V_s = \frac{N_s}{N_p} V_p \quad \text{[Math. 8]}$$

Here, the number of turns of the winding on the primary side is Ns, and the number of turns of the winding on the secondary side is Np. Thus, it is possible to avoid measurement at a portion having a high voltage.

When the calculation processing of the post-discharge inter-gap voltage $V_g$ is completed, the calculation operation of the inter-gap voltage in the inter-gap voltage calculation unit 31 is completed. Then, the inter-gap voltage calculation unit 31 outputs the calculated reference inter-gap voltage $V_{g0}$ and post-discharge inter-gap voltage $V_g$ to the flow velocity calculation unit 32. In addition, the inter-gap voltage calculation unit 31 performs the calculation operation of the inter-gap voltage every one cycle.

[Calculation Operation of Flow Velocity]

Next, a calculation operation of the flow velocity in the flow velocity calculation unit 32 will be described with reference to FIG. 9.

Figure 9:
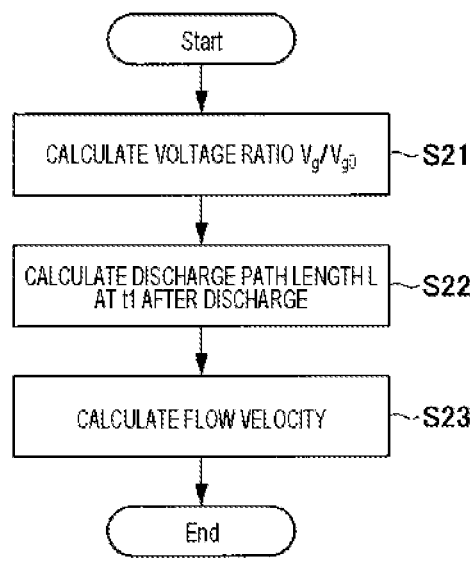
FIG. 9 is a flowchart illustrating a calculation operation of a flow velocity in a flow velocity calculation unit according to the first embodiment.

FIG. 9 is a flowchart illustrating the calculation operation of the flow velocity in the flow velocity calculation unit 32.

As illustrated in FIG. 9, the flow velocity calculation unit 32 calculates a ratio $r_v$ between the reference inter-gap voltage $V_{g0}$ input from the inter-gap voltage calculation unit 31 and the post-discharge inter-gap voltage $V_g$ (Step S21). The ratio $r_v$ is referred to as a voltage ratio below. A voltage ratio $r_v$ is obtained by $V_g/V_{g0}$.

Then, the flow velocity calculation unit 32 calculates the discharge path length $L_{sp, ti}$ at the setting time ti after discharge by using the calculated voltage ratio $r_v$ and the following Expression 9.

$$L_{sp,ti} = a r_v + b \quad \text{[Math. 9]}$$

Here, a and b are coefficients obtained from experiments.

In addition, when Expression 3 being the above-described expression of Kim and Anderson is arranged as the discharge path length $L_{sp}$, the following Expression 10 is obtained.

$$L_{sp} = 2.5 \times 10^{-5} V_g \left( \frac{p}{p_0} \right)^{-0.51} I_s^{0.32} \quad \text{[Math. 10]}$$

The discharge path length $L_{sp}$ calculated by Expression 10 has an error in the measurement value of the discharge path. This error is considered to be caused by an error due to sensor specifications, a change in the internal resistance, a sheath voltage, and other ungrasped decreases. Further, as shown in Expression 10, the discharge path length $L_{sp}$ is a function of the inter-gap voltage $V_g$, the in-cylinder pressure p at the ignition timing, and the secondary current $I_s$. On the other hand, the discharge path length $L_{sp, ti}$ calculated by Expression is represented by a linear expression with respect to an explanatory variable (voltage ratio). Furthermore, in Expression 9, the voltage ratio $r_v$ is used as the explanatory variable so that the coefficients a and b can be adapted under a plurality of pressure and current conditions.

Thus, by calculating the discharge path length $L_{sp, ti}$ from Expression 9, it is possible to remove the influence of the secondary current and the pressure from the explanatory variable (voltage ratio). As a result, it is possible to accurately calculate the discharge path length by a single relational expression under a plurality of pressure conditions and secondary current conditions.

The discharge path length $L_{sp, ti}$ may be calculated from Expression 10 without using the voltage ratio $r_v$. The calculation expression in this case is the following Expression 11.

$$L_{sp,ti} = 2.5 \times 10^{-5} V_g \left( \frac{p}{p_0} \right)^{-0.51} I_s^{0.32} \quad \text{[Math. 11]}$$

By forming a calculation expression of the discharge path length $L_{sp, ti}$ from the known relational expressions shown in Expressions 10 and 11, it is possible to calculate the discharge path length $L_{sp, ti}$ without defining a new relational expression as shown in Expressions 7 and 9.

Then, the flow velocity calculation unit 32 calculates the flow velocity $u_p$ [m/s] around the ignition plug 17 from the calculated discharge path length $L_{sp, ti}$ after the setting time ti (Step S23). The flow velocity $u_p$ around the ignition plug is calculated by the following Expression 12.

$$u_p = \frac{L_{sp,ti} - L_G}{2 t_i} \quad \text{[Math. 12]}$$

Thus, the calculation operation of the flow velocity $u_p$ in the flow velocity calculation unit 32 is completed. The flow velocity calculation unit 32 outputs the calculated flow velocity $u_p$ to the flow velocity range calculation unit 33. The flow velocity calculation unit 32 performs the calculation operation of the flow velocity $u_p$ every one cycle. As described above, the flow velocity $u_p$ around the ignition plug 17 can be calculated from the measurement value of the coil voltage at one point, or other measurable signals and calculated values. Furthermore, by limiting the measurement point to one point, it is possible to reduce the calculation load and the load of each sensor.

[Operation of Flow Velocity Range Calculation Unit]

Next, an operation example of the flow velocity range calculation unit 33 will be described with reference to FIG. 10.

Figure 10:
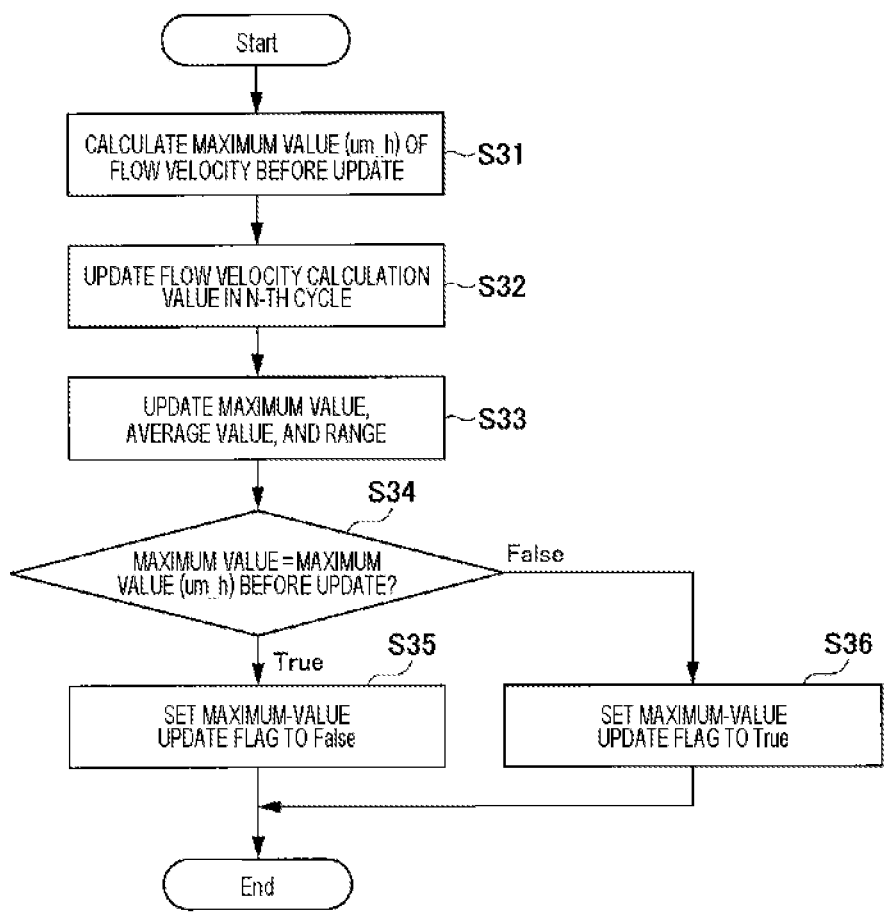
FIG. 10 is a flowchart illustrating an operation example of flow velocity range calculation according to the first embodiment.

FIG. 10 is a flowchart illustrating an operation example of the flow velocity range calculation unit 33.

As illustrated in FIG. 10, first, the flow velocity range calculation unit 33 calculates the maximum value (um_h) before the update of the flow velocity, which is stored in the RAM 23c or the flow velocity range calculation unit 33 itself (Step S31). Then, the flow velocity range calculation unit 33 updates the flow velocity calculation value (flow velocity) in the Nth cycle (Step S32). In the process of Step S32, the flow velocity range calculation unit 33 deletes the data (flow velocity calculation value) in the oldest cycle among the plurality of stored flow velocity calculation values, and stores the flow velocity calculation value calculated by the flow velocity calculation unit 32 in this cycle.

Then, the flow velocity range calculation unit 33 updates the maximum value, the average value, and the flow velocity range of the flow velocity calculation values for the predetermined number N of cycles, by using the new flow velocity calculation value in the Nth cycle, which is stored in the process of Step S32 (Step S34).

Then, the flow velocity range calculation unit 33 determines whether or not the maximum value of the flow velocity calculation value before update is equal to the maximum value updated in the process of Step S34 (Step S34). In the process of Step S34, when the flow velocity range calculation unit 33 determines that the maximum value before update is equal to the updated maximum value (True determination of Step S34), the process proceeds to a process of Step S35 described later.

When the flow velocity range calculation unit 33 determines that the maximum value before update and the updated maximum value are not equal, in the processing of Step S34 (False determination of Step S34), the process proceeds to the process of Step S36 described later.

When the process proceeds to Step S35, the maximum value has not been updated. Thus, the flow velocity range calculation unit 33 sets the maximum-value update flag to False. On the other hand, when the process proceeds to Step S36, the maximum value has been updated to a new value. Thus, the flow velocity range calculation unit 33 sets the maximum-value update flag to True. Thus, the operation of the flow velocity range calculation unit 33 is completed. In addition, the flow velocity range calculation unit 33 outputs the updated or calculated maximum value, average value, flow velocity range, and update flag information to the target output calculation unit 34.

[Operation of Target Output Calculation Unit]

Next, an operation example of the target output calculation unit 34 will be described with reference to FIGS. 11 and 12.

Figure 11:
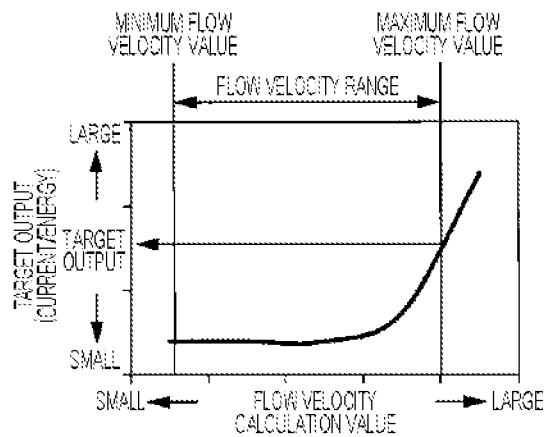
FIG. 11 is a diagram illustrating a relation between a flow velocity around an ignition plug and a target output.

FIG. 11 is a diagram illustrating a relation between the flow velocity $u_p$ around the ignition plug 17 and the target output.

There is an upper limit to the range in which the discharge path can be extended. Therefore, under the condition of a large flow velocity, the discharge path reaches the upper limit of the range in which the discharge path can be extended in a short time, and a so-called re-discharge or re-strike in which the discharge path is formed in the shortest path again occurs. When the re-discharge occurs, the heating of the air-fuel mixture heated by the energy supply before the re-discharge is stopped. As a result, when the energy supply before re-discharge is insufficient, flame is not formed, and so-called misfire occurs.

In order to prevent such misfire, it is necessary to sufficiently supply the energy to the air-fuel mixture before re-discharge. Therefore, as illustrated in FIG. 11, the target output is set to be large under a condition in which the flow velocity around the ignition plug 17 is large (maximum flow velocity value).

Figure 12:
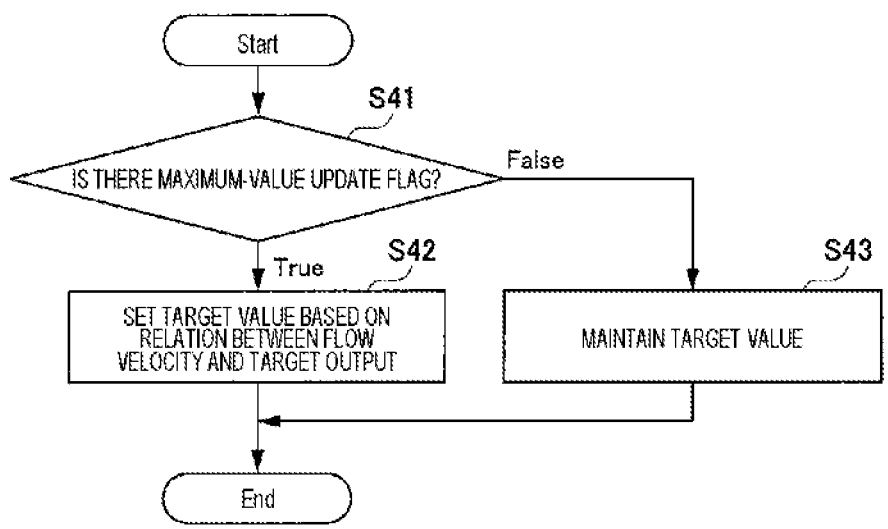
FIG. 12 is a flowchart illustrating an operation example of a target output calculation unit according to the first embodiment.

FIG. 12 is a flowchart illustrating an operation example of the target output calculation unit 34.

As illustrated in FIG. 12, the target output calculation unit 34 determines the value of maximum-value update flag information input from the flow velocity range calculation unit (Step S41). When the target output calculation unit 34 determines that the maximum-value update flag is True in the process of Step S41, the target output calculation unit 34 sets a target value based on the relation between the flow velocity and the target output illustrated in FIG. 11 (Step S42). Then, the target output calculation unit 34 outputs the set target value to the operation amount calculation unit 35.

When the target output calculation unit 34 determines that the maximum-value update flag is False in the process of Step S41, the target output calculation unit 34 maintains the currently set target value (Step S43). Thus, the operation of the target output calculation unit 34 is completed.

[Time Chart of Calculation Operation]

Next, a time chart of the calculation operation in the ignition control unit 24 will be described with reference to FIG. 13.

Figure 13:
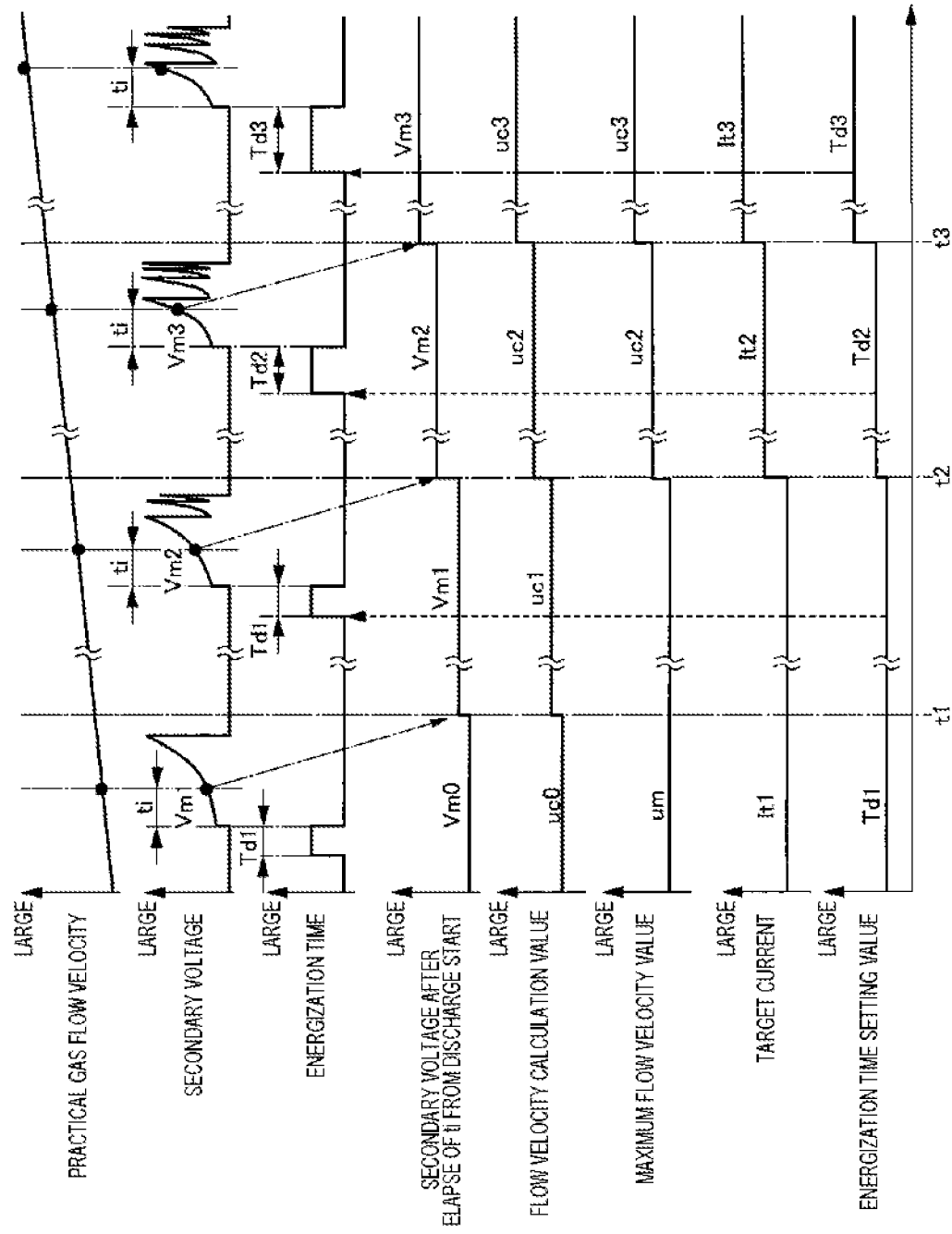
FIG. 13 is a flowchart illustrating a calculation operation of various types of information in the ignition control unit according to the first embodiment.

FIG. 13 is a time chart illustrating a calculation operation of various types of information in the ignition control unit 24.

The time chart illustrated in FIG. 13 shows the time histories of the actual flow velocity, the secondary voltage, the energization time to the ignition coil 16, the secondary voltage value after the setting time ti after discharge, the flow velocity calculation value, the maximum flow velocity value, the target current (target value), and the energization time setting value. The output of detection values and various calculation operations are performed at time points t1, t2, and t3.

At the time point t1, a secondary voltage Vm1 in the previous cycle is transmitted, and a flow velocity uc0 is calculated based on the secondary voltage Vm1. Then, the maximum flow velocity value um, a target current It1, and an energization time setting value Td1 for N cycles are calculated. At the time point t1, the flow velocity uc1 calculated using the secondary voltage Vm1 is smaller than the maximum value um before update. Thus, the flow velocity range calculation unit 33 does not update the maximum flow velocity value. Therefore, the target current It1 and the energization time setting value Td1 are not updated either.

At the time point t2, a flow velocity uc2 calculated based on a secondary voltage Vm2 is larger than the previous maximum flow velocity value um. Therefore, the maximum flow velocity value is updated from the flow velocity um to the flow velocity uc2. As a result, the target current is updated from It1 to It2, and the energization time setting value is updated from Td1 to Td2. As a result, the energization time to the ignition coil 16 in the next cycle is set to Td2.

Also at the time point t3, a flow rate uc3 calculated based on a secondary voltage Vm3 is larger than the previous maximum flow velocity value u2. Thus, the maximum flow velocity value is updated to the flow velocity uc3. As a result, the target current and the energization time setting value are updated based on the maximum flow velocity value.

In this manner, it is possible to set the flow velocity at the ignition timing and the target value of the output to the ignition coil 16 based on the detection value of the voltage of the ignition coil 16. As a result, it is possible to control the energization time to the ignition coil 16 based on the calculated flow velocity, to suppress the generation of excessive energy, and to suppress the shortage of the supply energy. In addition, since it is possible to suppress the generation of the excessive energy, it is possible to prevent wear of the ignition plug 17.

2. Second Embodiment

Next, an ignition control unit according to a second embodiment will be described with reference to FIGS. 14 to 17.

Figure 14:
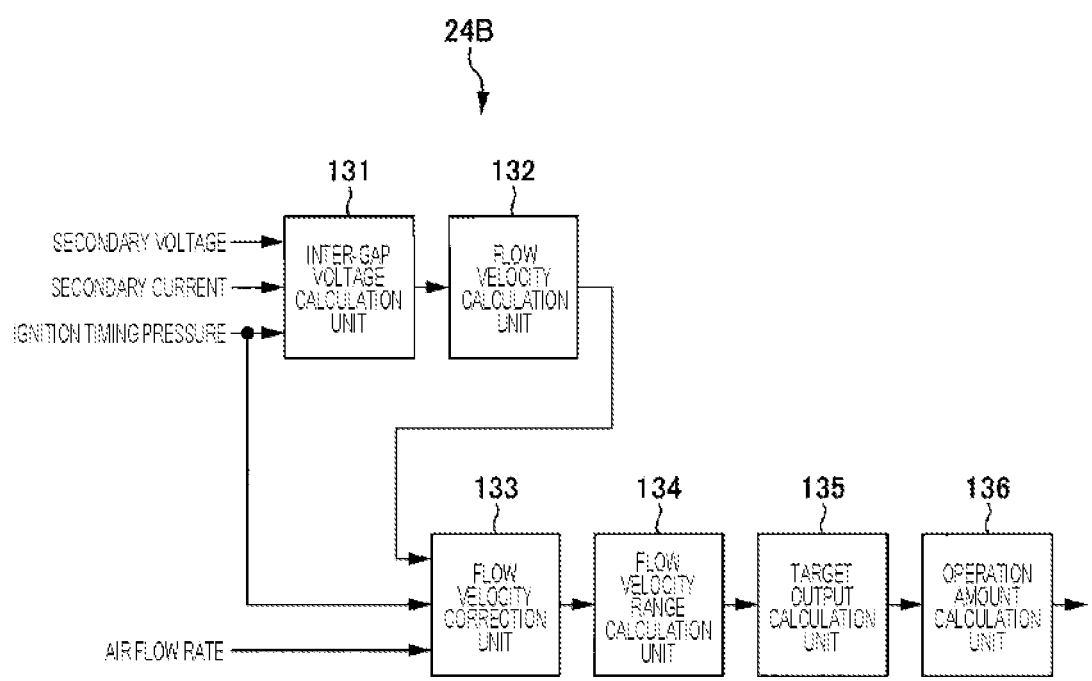
FIG. 14 is a control block diagram illustrating an outline of an ignition control unit according to a second embodiment.

FIG. 14 is a control block diagram illustrating an outline of discharge energy control in the ignition control unit according to the second embodiment.

As illustrated in FIG. 14, an ignition control unit 24B includes an inter-gap voltage calculation unit 131, a flow velocity calculation unit 132, a flow velocity correction unit 133, a flow velocity range calculation unit 134, a target output calculation unit 135, and an operation amount calculation unit 136. That is, the ignition control unit 24B according to the second embodiment is obtained by providing the flow velocity correction unit 133 in the ignition control unit 24 according to the first embodiment. Therefore, the flow velocity correction unit 133 will be described here.

The air flow rate measured by the air flow sensor 1 is output to the flow velocity correction unit 133. The flow velocity correction unit 133 corrects the flow velocity calculation value calculated by the flow velocity calculation unit 132. The flow velocity calculation value corrected by the flow velocity correction unit 133 is output to the flow velocity range calculation unit 134.

Next, an operation example of the flow velocity correction unit 133 will be described with reference to FIG. 15.

Figure 15:
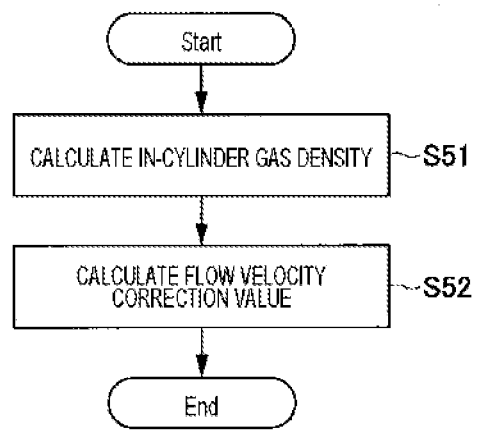
FIG. 15 is a flowchart illustrating an operation example of a flow velocity correction unit according to the second embodiment.

FIG. 15 is a flowchart illustrating an operation example of the flow velocity correction unit 133.

As illustrated in FIG. 15, the flow velocity correction unit 133 calculates the in-cylinder gas density of the cylinder 14 (Step S51). The flow velocity correction unit 133 calculates the in-cylinder gas density p [kg/m$^3$] being gas density in the hollow of the cylinder 14 from the following Expression 13 based on an intake air flow rate $M_{air}$ [kg] acquired from the air flow sensor 1, an exhaust air-fuel ratio AFR measured by the air-fuel ratio sensor 9, an in-cylinder volume $V_{ADV}$ [m$^3$] at the ignition timing, and an engine rotational speed $N_e$.

$$\rho = \frac{\dot{M}_{air}}{V_{ADV}}\left(1 + \frac{1}{AFR}\right)\frac{120}{N_e} \qquad \text{[Math. 13]}$$

then, the flow velocity correction unit 133 corrects the flow velocity calculation value calculated by the flow velocity calculation unit 132 based on the in-cylinder gas density p calculated in Step S51 and the input in-cylinder pressure (Step S52). The flow velocity correction unit 133 outputs the corrected flow velocity calculation value to the flow velocity range calculation unit 134. Thus, the operation of the flow velocity correction unit 133 is completed.

[Correction Operation Example]

Next, a correction method performed in the process of Step S52 will be described.

As an example of the correction method, a relation between the flow velocity calculated by the flow velocity calculation unit 132 and the corrected flow velocity calculation value is obtained by an experiment performed in advance, and map data is created and stored in a memory such as the ROM 23b. The flow velocity correction value is calculated based on the created map data and the acquired flow velocity calculation value. The flow velocity correction unit 133 corrects the flow velocity calculation value based on the calculated flow velocity correction value.

Figure 16:
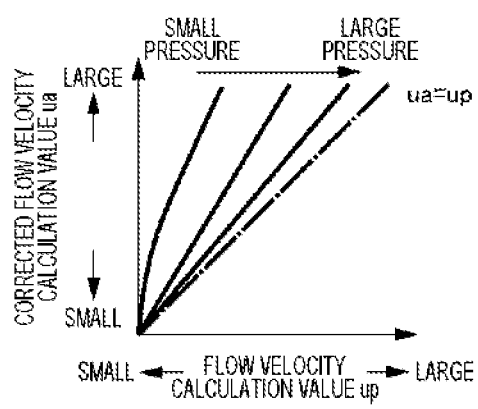
FIG. 16 illustrates map data showing a relation between a flow velocity calculation value calculated by a flow velocity calculation unit and a corrected flow velocity calculation value, according to the second embodiment.

FIG. 16 illustrates map data showing a relation between the flow velocity calculation value calculated by the flow velocity calculation unit 132 and the corrected flow velocity calculation value.

As illustrated in FIG. 16, it can be seen that the corrected flow velocity $u_a$ is larger than the flow velocity $u_p$ before correction. In addition, it can be seen that a difference between the flow velocity $u_p$ before correction and the corrected flow velocity $u_a$ decreases as the in-cylinder pressure increases. By using the map data as illustrated in FIG. 16, it is possible to correct the flow velocity without adding a new sensor.

Next, another correction method will be described.

In another correction method, the difference between the flow velocity $u_p$ calculated by the flow velocity calculation unit 132 and the actual gas flow velocity is caused by Maxwell stress. The corrected flow velocity $u_a$ is calculated by Expression 14 derived from the Maxwell stress.

$$u_a = u_p + \sqrt{\frac{\pi r_{ref}}{\rho L_G}\frac{\varepsilon_0}{2}\left(\frac{V_{ref}}{L_G}\right)^2\left(\frac{p_{ref}}{p}\right)^n} \qquad \text{[Math. 14]}$$

Here, among the corrected flow velocity calculation value $u_a$ [m/s], the flow velocity calculation value $u_p$ [m/s] calculated by the flow velocity calculation unit 132, a reference discharge path radius $r_{ref}$ [m], a dielectric constant $\varepsilon_0$ [F/m] of vacuum, a reference inter-electrode voltage $V_{ref}$ [V], reference pressure $p_{ref}$ [Pa], and a coefficient n, the reference discharge path radius, the reference inter-electrode voltage, and the coefficient are determined so that a correction expression shown in Expression 14 reproduces the experimental results. The coefficient n has a recommended value of, for example, 0.5 to 1, but may be set to other values.

Next, a point that the correction by Expression 14 described above corrects the effect of the Maxwell stress will be described with reference to FIGS. 17A and 17B.

Figure 17A:
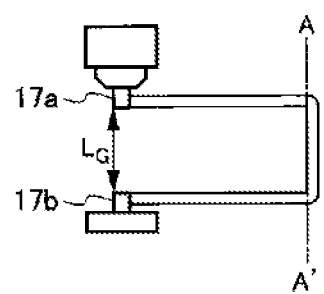
Figure 17B:
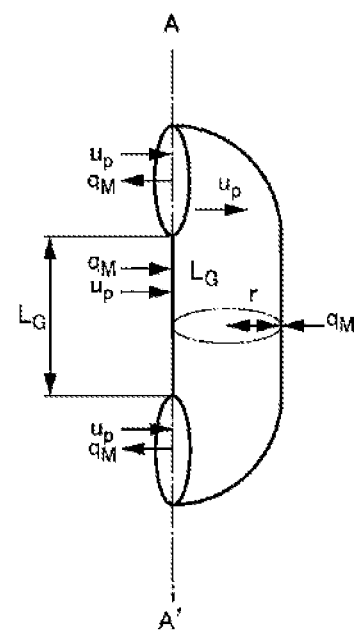

FIGS. 17A and 17B are diagrams illustrating a relation of forces acting on the distal end portion of the discharge path. FIG. 17A illustrates a state in which the discharge path extends. FIG. 17B is a diagram in which the distal end portion is extracted from a cross section taken along line A-A' of the discharge path illustrated in FIG. 17A.

In FIG. 17B, qM indicates the Maxwell stress and r is the radius of the discharge path. The Maxwell stress is stress that acts in a direction perpendicular to a surface and a cross-section of a conductor placed in an electric field. When the entire distal end portion of the discharge path is defined as an inspection volume, and the momentum conservation law in the inspection volume is considered, the following Expressions 15 and 16 are established.

$$\rho u_p(u_a-u_p)(2rL_G)+\rho u_a(u_a-u_p)(2rL_G)=-2q_M(\pi r^2) \quad \text{[Math. 15]}$$

$$q_M = \tfrac{1}{2}\varepsilon_0 E^2 \quad \text{[Math. 16]}$$

The first term on the left side of Expression 15 indicates the outflow amount of the momentum from the inspection volume, and the second term on the left side indicates the inflow amount of the momentum into the inspection volume. The term on the right side in Expression 15 is a force acting on the inspection volume. Expression 16 is an expression for giving the Maxwell stress, and E is the electric field strength [V/m]. Furthermore, consider a relation in which the inter-gap voltage as shown by the Kim-Anderson expression is proportional to about 0.5 power of pressure. When it is assumed that the electric field intensity can be approximated by the inter-gap voltage and the distance between the gaps, the following Expression 17 is derived as an approximate expression of the electric field intensity.

$$E = \frac{V_{ref}}{L_G}\left(\frac{p_0}{p}\right)^{-0.5} \quad \text{[Math. 17]}$$

In addition, it is known that the radius of the discharge path changes in accordance with the pressure at which the discharge path is formed. This is considered to be because individual diffusion is suppressed as the pressure increases. By considering this effect, the radius of the discharge path is obtained from the following Expression 18.

$$r = r_0\left(\frac{p_0}{p}\right)^{n+1} \quad \text{[Math. 18]}$$

The above-described Expression 14 is obtained by arranging using Expressions 15 to 18. From the above description, it is shown that Expression 14 is a correction expression calculated by focusing on the distal end portion of the discharge path and considering the Maxwell stress acting on the distal end portion of the discharge path. Thus, by performing correction based on Expression 14 in the flow velocity correction unit 133, it is possible to correct a difference between the flow velocity $u_p$ calculated by the flow velocity calculation unit 132 caused by the Maxwell stress and the actual gas flow velocity.

As a result, it is possible to improve the measurement accuracy of the flow velocity in the ignition control unit 24B.

3. Third Embodiment

Next, an ignition control unit and a tumble-control-valve control unit according to a third embodiment will be described with reference to FIGS. 18 to 21.

Figure 18:
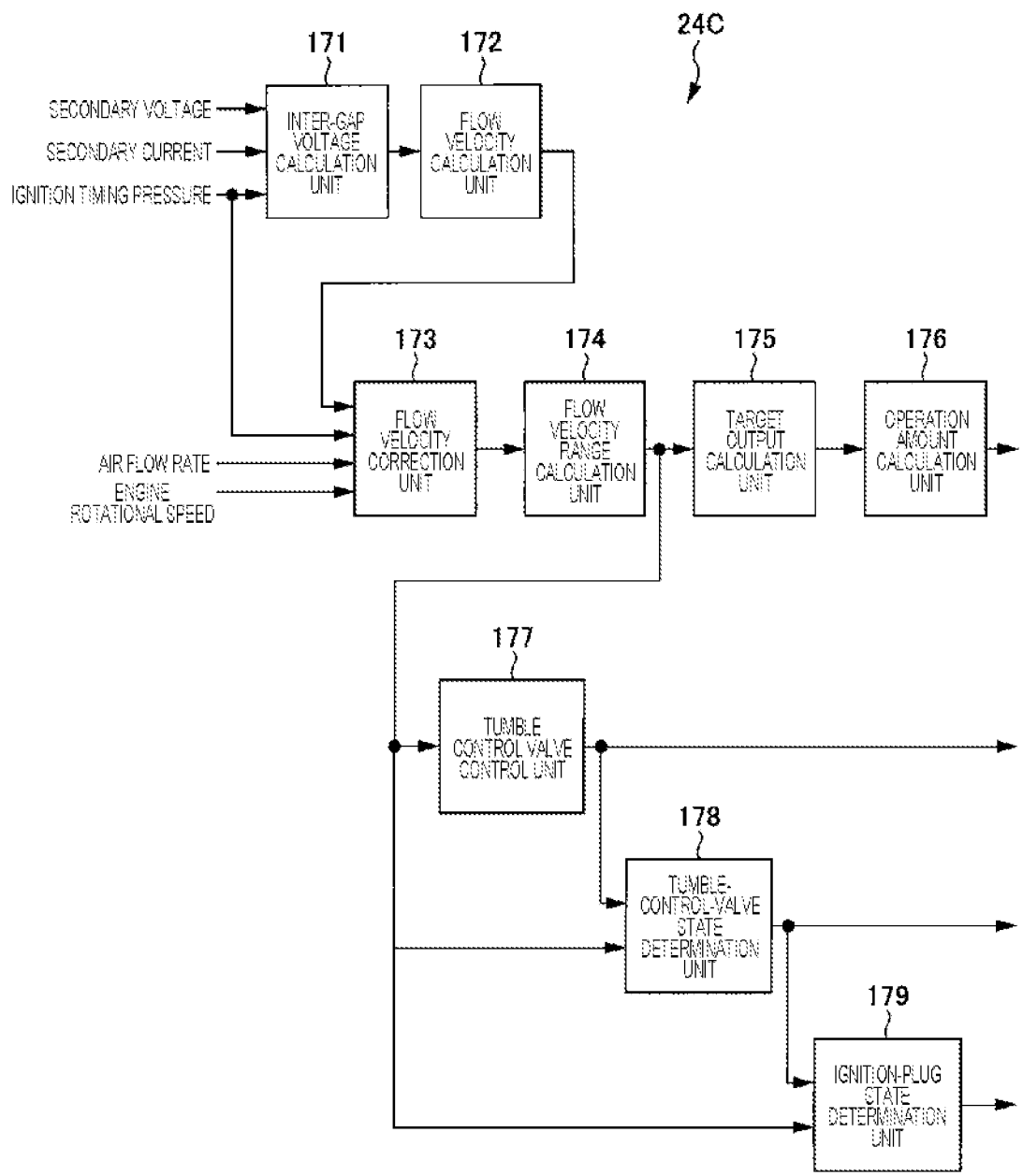
FIG. 18 is a control block diagram illustrating an outline of an ignition control unit and a tumble-control-valve control unit according to a third embodiment.

FIG. 18 is a control block diagram illustrating an outline of discharge energy control in the ignition control unit and the tumble-control-valve control unit according to the third embodiment.

As illustrated in FIG. 18, a tumble-control-valve control unit 177, a tumble-control-valve state determination unit 178, and an ignition-plug state determination unit 179 are connected to an ignition control unit 24C. Similarly to the ignition control unit 24B according to the second embodiment, the ignition control unit 24C includes an inter-gap voltage calculation unit 171, a flow velocity calculation unit 172, a flow velocity correction unit 173, a flow velocity range calculation unit 174, a target output calculation unit 175, and an operation amount calculation unit 176. The flow velocity range calculation unit 174 outputs the calculated average flow velocity value to the tumble-control-valve control unit 177, the tumble-control-valve state determination unit 178, and the ignition-plug state determination unit 179.

The tumble-control-valve control unit 177 determines the opening/closing degree of the tumble control valve 8b based on the average flow velocity value. The tumble-control-valve control unit 177 outputs the tumble control valve operation amount to the tumble control valve 8b based on the determined opening/closing degree.

In addition, the tumble-control-valve control unit 177 outputs an on-off valve operation-amount change flag indicating whether or not the change amount of the target value of the opening/closing degree in the tumble control valve 8b is larger than a predetermined value. Here, the on-off valve operation-amount change flag is set to True when the target value change amount of the opening/closing degree is larger than the predetermined value. When the target value change amount of the opening/closing degree has not reached the predetermined value, the on-off valve operation-amount change flag is set to False. In addition, the tumble-control-valve control unit 177 outputs the determined on-off valve operation-amount change flag to the tumble-control-valve state determination unit 178.

The tumble-control-valve state determination unit 178 determines whether or not failure has occurred in the tumble control valve 8b, based on the on-off valve operation-amount change flag output from the tumble-control-valve control unit 177 and the average flow velocity value output from the flow velocity range calculation unit 174. The tumble-control-valve state determination unit 178 determines a tumble-control-valve failure flag indicating a failure state of the tumble control valve 8b.

When there is a possibility of failure in the tumble control valve 8b, the tumble-control-valve failure flag is determined to be True. When the tumble control valve 8b is normal, the tumble-control-valve failure flag is determined to be False. The tumble-control-valve state determination unit 178 outputs the determined tumble-control-valve failure flag to the ignition-plug state determination unit 179.

The ignition-plug state determination unit 179 determines whether or not failure has occurred in the ignition plug 17, based on the tumble-control-valve failure flag output from the tumble-control-valve state determination unit 178 and the average flow velocity value output from the flow velocity range calculation unit 174. In addition, the ignition-plug state determination unit 179 determines a resistance decrease flag and a resistance increase flag indicating a state of failure of the ignition plug 17.

The resistance decrease flag is a flag indicating the possibility of abnormality in which the resistance value is lower than the design value.

When the resistance decrease flag is determined to be True, it is indicated that there is a possibility of abnormality in which the resistance value of the ignition plug 17 is lower than the design value.

The resistance increase flag is a flag indicating a possibility of abnormality in which the resistance value increases to be more than the design value. When the resistance increase flag is determined to be True, it is indicated that there is a possibility of abnormality in which the resistance value of the ignition plug 17 increases to be more than the design value.

In addition, the ignition-plug state determination unit 179 sets a correction value $R_{int, mod}$ of the internal resistance of the ignition plug 17 in Expression 6 to the design value $R_{int, 0}$.

[Operation of Tumble-Control-Valve Control Unit]

Next, an operation example of the tumble-control-valve control unit 177 will be described with reference to FIG. 19.

Figure 19:
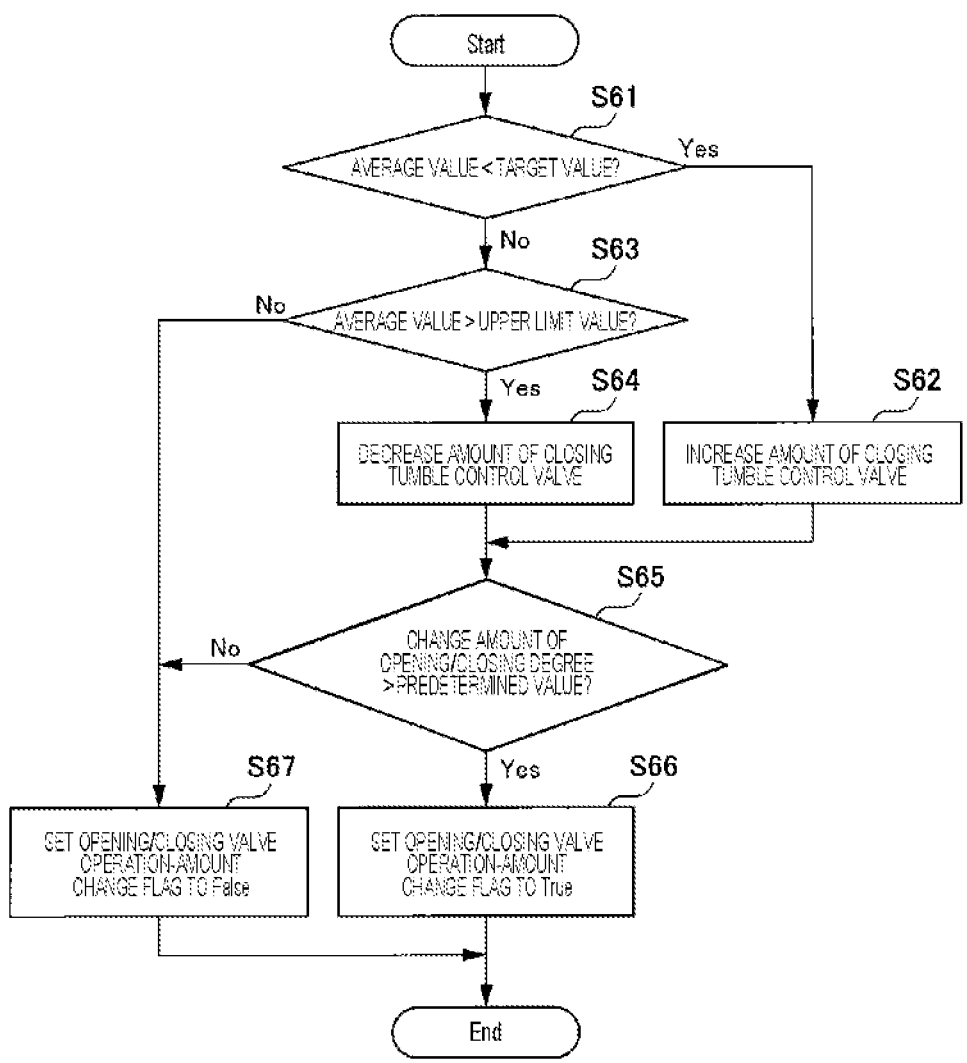
FIG. 19 is a flowchart illustrating an operation example of the tumble-control-valve control unit according to the third embodiment.

FIG. 19 is a flowchart illustrating the operation example of the tumble-control-valve control unit 177.

As illustrated in FIG. 19, the tumble-control-valve control unit 177 determines whether or not the average flow velocity value acquired from the flow velocity range calculation unit 174 is smaller than the target value (flow velocity target value) (Step S61). The target value used in the process of Step S61 is determined based on the number of revolutions of the internal combustion engine 100 determined by the output of the crank angle sensor 19 and the map of the flow velocity target value. The map data is stored in the memory such as the ROM 23b, for example.

In the process of Step S61, when the tumble-control-valve control unit 177 determines that the average flow velocity value is smaller than the target value (Yes determination of Step S61), the tumble-control-valve control unit 177 sets the operation amount to control the tumble control valve 8b in the more closing direction. Thus, the closing amount of the tumble control valve 8b increases (Step S62). It is possible to set the increase amount (change amount) of the closing amount from, for example, a relational expression and a difference between the target value and the average flow velocity value, by defining the relational expression proportional to the difference between the target value and the average flow velocity value and the change amount.

Then, when the process of Step S62 is completed, the tumble-control-valve control unit 177 proceeds to the process of Step S65 described later.

When the average value of the flow velocity calculation value for a plurality of cycles is smaller than the flow velocity lower limit value, the tumble-control-valve control unit 177 controls the tumble control valve 8b to realize the target flow rate condition. Thus, when a condition under which the flow velocity is too low is detected, it is possible to realize a more stable and high-speed fuel state by increasing the flow velocity. As a result, it is possible to eliminate a case where the operation of the tumble control valve 8b deviates from the assumed operation due to aging deterioration, or a variation due to individual differences, and to realize desired performance.

When the tumble-control-valve control unit 177 determines that the average flow velocity value is larger than the target value in the process of Step S61 (No determination of Step S61), the tumble-control-valve control unit 177 determines whether or not the average flow velocity value is larger than the upper limit value (Step S63).

In the process of Step S63, when the tumble-control-valve control unit 177 determines that the average flow velocity value is smaller than the upper limit value (Yes determination of Step S63), the tumble-control-valve control unit 177 sets the operation amount to control the tumble control valve 8b in the more opening direction. Thus, the closing amount of the tumble control valve 8b decreases (Step S64). It is possible to set the decrease amount (change amount) of the closing amount from, for example, a relational expression and a difference between the upper limit value and the average flow velocity value, by defining the relational expression proportional to the difference between the upper limit value and the average flow velocity value and the change amount.

When the average value of a plurality of cycles of the flow velocity calculation value exceeds the flow velocity upper limit value, the tumble-control-valve control unit 177 controls the tumble control valve 8b in a direction of further opening the tumble control valve 8b. Thus, when a condition where the flow velocity is excessive is detected, it is possible to reduce the flow velocity and to avoid that excessive energy is required under a high flow velocity condition. As a result, it is possible to suppress the progress of the deterioration due to the high temperature of the ignition coil 16 and the wear of the ignition plug 17 due to the high energy.

When the process of Step S64 is completed, the process proceeds to the process of Step S65. In the process of Step S65, the tumble-control-valve control unit 177 determines whether or not the opening/closing degree change amount (the decrease amount of the closing amount or the increase amount of the closing amount) set in the process of Step S62 or the process of Step S64 is larger than a predetermined value. The predetermined value used in Step S65 is set to a value that is assumed to have a sufficient difference from the average flow velocity value.

Then, in the processing of Step S65, when the tumble-control-valve control unit 177 determines that the opening/closing degree change amount is larger than the predetermined value (Yes determination of Step S65), the tumble-control-valve control unit 177 sets the on-off valve operation-amount change flag to True (Step S66).

In the process of Step S63, when the tumble-control-valve control unit 177 determines that the average flow velocity value is smaller than the upper limit value (No determination of Step S63), the process proceeds to the process of Step S67. Further, when determining that the opening/closing degree change amount is smaller than the predetermined value in the process of Step S65 (No determination of Step S65), the tumble-control-valve control unit 177 proceeds to the process of Step S67.

In the process of Step S67, the tumble-control-valve control unit 177 sets the on-off valve operation-amount change flag to False. Then, the tumble-control-valve control unit 177 outputs the on-off valve operation-amount change flag set in Step S66 or Step S67 to the tumble-control-valve state determination unit 178. Thus, the operation of the tumble-control-valve control unit 177 is completed.

[Operation of Tumble-Control-Valve State Determination Unit]

Next, an operation example of the tumble-control-valve state determination unit 178 will be described with reference to FIG. 20.

Figure 20:
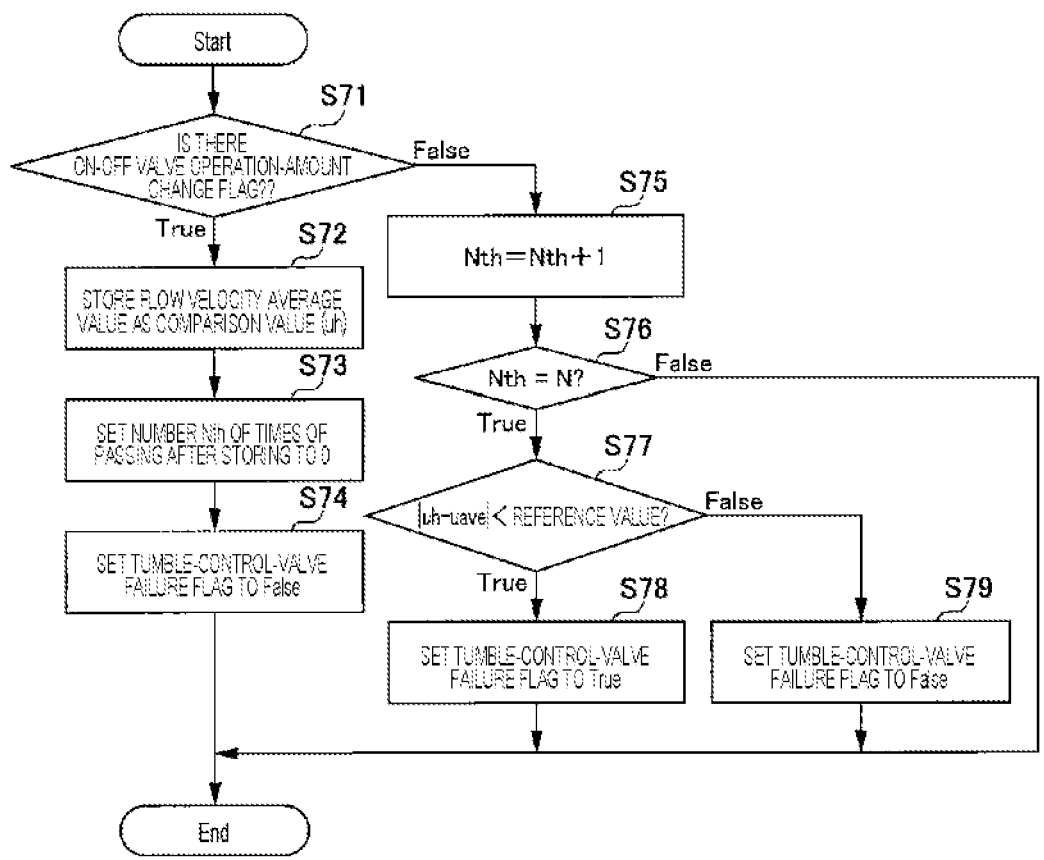
FIG. 20 is a flowchart illustrating an operation example of a tumble-control-valve state determination unit according to the third embodiment.

FIG. 20 is a flowchart illustrating the operation of the tumble-control-valve state determination unit 178.

As illustrated in FIG. 20, first, the tumble-control-valve state determination unit 178 determines the state of the on-off valve operation-amount change flag output from the tumble-control-valve control unit 177 (Step S71).

In the process of Step S71, when the tumble-control-valve state determination unit 178 determines that the on-off valve operation-amount change flag is True, the process proceeds to the process of Step S72. In the process of Step S71, when the tumble-control-valve state determination unit 178 determines that the on-off valve operation-amount change flag is False, the process proceeds to the process of Step S75.

In the process of Step S72, the tumble-control-valve state determination unit 178 stores the average flow velocity value before the tumble control valve 8b is operated, as a comparison value. This comparison value is a value for comparison for determining whether or not a difference occurs in the average flow velocity value before and after the operation of the tumble control valve 8b.

Then, the tumble-control-valve state determination unit 178 sets the value of a counter Nth to "0" (Step S73). The counter Nth counts the number of times of a series of operations in the tumble-control-valve state determination unit 178 after the on-off valve operation amount greatly changes, that is, the on-off valve operation-amount change flag is determined to be True.

Then, the tumble-control-valve state determination unit 178 sets the tumble-control-valve failure flag to False (Step S74). The tumble-control-valve state determination unit 178 outputs the set tumble-control-valve failure flag to the ignition-plug state determination unit 179. Thus, one operation in the tumble-control-valve state determination unit 178 is completed.

In the process of Step S75, the counter Nth is incremented by 1. Thus, after the operation amount of the tumble control valve 8b is updated, the number of times of the series of operations being performed in the tumble-control-valve state determination unit 178 is counted.

Then, the tumble-control-valve state determination unit 178 determines whether or not the value of the counter Nth is equal to the number of pieces of data N stored in the flow velocity range calculation unit 174, that is, the value of the predetermined number N of cycles (Step S76). In the process of Step S76, when the value of the counter Nth is equal to the value of the number of pieces of data N, all the pieces of flow velocity information stored in the flow velocity range calculation unit 174 are pieces of flow velocity information after the opening/closing operation of the tumble control valve 8b is performed.

In the process of Step S76, when the tumble-control-valve state determination unit 178 determines that the value of the counter Nth is not equal to the value of the number of pieces of data N (False determination of Step S76), the tumble-control-valve state determination unit 178 completes the operation.

In the process of Step S76, when the tumble-control-valve state determination unit 178 determines that the value of the counter Nth is equal to the value of the number of pieces of data N (True determination of Step S76), the tumble-control-valve state determination unit determines whether or not a difference between the flow velocity comparison value (uh) and the average flow velocity value (uave) is smaller than a reference value (Step S77). The flow velocity comparison value is a value stored in the process of Step S72 in the processing operation before the current processing operation. In addition, in the process of Step S77, it is determined whether the flow velocity has been changed.

When it is determined in the processing of Step S77 that the difference between the flow velocity comparison value and the average flow velocity value is smaller than the reference value (True determination of Step S77), the tumble-control-valve state determination unit 178 sets the tumble-control-valve failure flag to True (Step S78). That is, since the flow velocity does not change even though the tumble control valve 8b is operated, the tumble-control-valve state determination unit 178 determines that there is a possibility that the tumble control valve 8b has failed. Then, the tumble-control-valve state determination unit 178 outputs the tumble-control-valve failure flag to the ignition-plug state determination unit 179.

When it is determined in the process of Step S77 that the difference between the flow velocity comparison value and the average flow velocity value is larger than the reference value (False determination of Step S77), the tumble-control-valve state determination unit 178 sets the tumble-control-valve failure flag to False (Step S79). That is, this indicates that the flow velocity changes in accordance with the operation of the tumble control valve 8b, and it is assumed that the tumble control valve 8b performs a desired operation. As a result, the tumble-control-valve state determination unit 178 determines that the tumble control valve 8b is normal. In addition, the tumble-control-valve state determination unit 178 outputs the tumble-control-valve failure flag to the ignition-plug state determination unit 179. Thus, the operation of the tumble-control-valve state determination unit 178 is completed.

As described above, the tumble-control-valve state determination unit 178 compares the average values of the flow velocities before and after the opening/closing degree of the tumble control valve 8b changes more than the predetermined value, and determines whether there is a change in the flow velocity. Then, based on this result, it is possible to determine whether or not the tumble control valve 8b is performing a desired operation, and to determine failure of the tumble control valve 8b.

[Operation of Ignition-Plug State Determination Unit]

Next, an operation example of the ignition-plug state determination unit 179 will be described with reference to FIG. 21.

Figure 21:
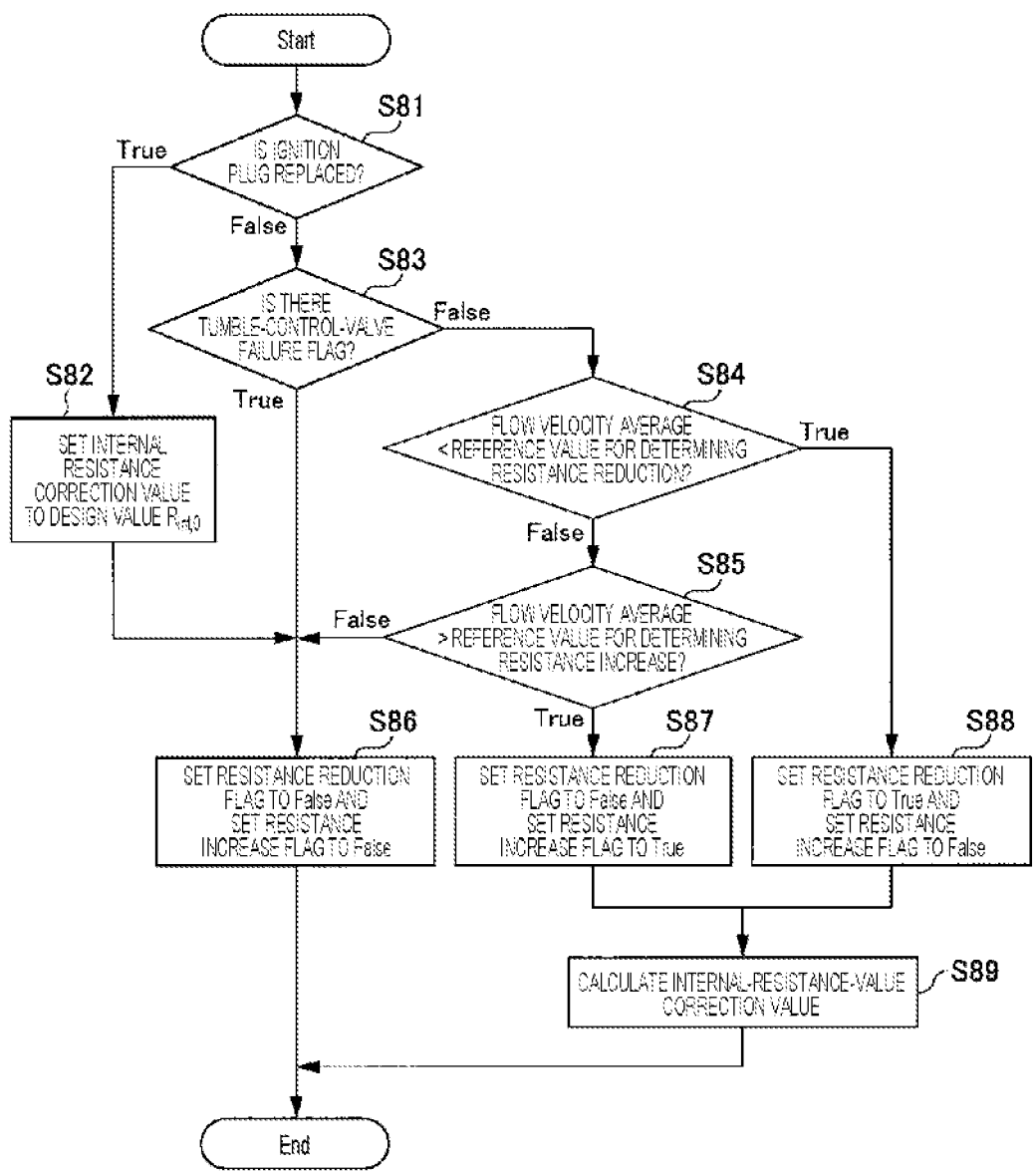
FIG. 21 is a flowchart illustrating an operation example of an ignition-plug state determination unit according to the third embodiment.

FIG. 21 is a flowchart illustrating the operation of the ignition-plug state determination unit 179.

As illustrated in FIG. 21, first, the ignition-plug state determination unit 179 determines whether or not the ignition plug 17 is replaced (Step S81). In the process of Step S81, when it is determined that the ignition plug 17 is replaced (True in Step S81), the ignition-plug state determination unit 179 sets the correction value $R_{int,\ mod}$ to a design value $R_{int,\ 0}$ of the internal resistance of the ignition plug 17 shown in Expression 6 (Step S82). Thus, by resetting the correction value of the internal resistance to the design value, it is possible to reflect the change in the internal resistance due to the replacement of the ignition plug 17 in the flow velocity calculation, and to improve the flow velocity calculation. In addition, when the process of Step S82 is completed, the ignition-plug state determination unit 179 proceeds to the process of Step S86 described later.

In the process of Step S81, when it is determined that the ignition plug 17 is not replaced (False in Step S81), the ignition-plug state determination unit 179 determines the tumble-control-valve failure flag (Step S83). In the process of Step S83, when determining that the tumble-control-valve failure flag is False (False determination of Step S83), the ignition-plug state determination unit 179 proceeds to the process of Step S84. In addition, in the process of Step S83, when determining that the tumble-control-valve failure flag is True (True determination of Step S83), the ignition-plug state determination unit 179 proceeds to the process of Step S86.

In the process of Step S84, the ignition-plug state determination unit 179 determines whether or not the average flow velocity value calculated by the flow velocity range calculation unit 174 is smaller than a resistance decrease determination reference value. Thus, it is possible to determine whether or not abnormality due to a decrease in the internal resistance of the ignition plug 17 has occurred.

Here, the resistance decrease determination reference value is a flow velocity reference value for determining abnormality due to a decrease in the internal resistance of the ignition plug 17.

In addition, when the internal resistance of the ignition plug 17 decreases, the calculated or detected secondary voltage decreases. Therefore, the voltage ratio in Expression 9 decreases, and the flow velocity calculation values calculated or corrected by the flow velocity calculation unit 132 and the flow rate correction unit 133 also decrease. Therefore, in order to determine the decrease in the internal resistance of the ignition plug 17, determination of whether or not the calculated flow velocity is smaller than expected may be performed. Thus, the resistance decrease determination reference value is used in the process of Step S84. The resistance decrease determination reference value is obtained by, for example, an experiment or a simulation performed in advance.

In the process of Step S84, when the ignition-plug state determination unit 179 determines that the average flow velocity value is equal to or greater than the resistance decrease determination reference value (False determination of Step S84), the process proceeds to Step S85. In the process of Step S84, when the ignition-plug state determination unit 179 determines that the average flow velocity value is smaller than the resistance decrease determination reference value (True determination of Step S84), the process proceeds to Step S88.

As described above, it is possible to determine the state of the flow velocity from the relation between the average value of the predetermined number N of cycles of the flow velocity calculation value calculated by the flow velocity calculation unit 172 and the reference value (resistance decrease determination reference value).

Furthermore, it is possible to determine whether or not the abnormality due to a decrease in the internal resistance of the ignition plug 17 has occurred based on the state of the average flow velocity value.

In the process of Step S85, the ignition-plug state determination unit 179 determines whether or not the average flow velocity value calculated by the flow velocity range calculation unit 174 is greater than a resistance increase determination reference value. Thus, it is possible to determine whether or not the abnormality due to an increase in the internal resistance of the ignition plug 17, that is, an increase in the internal resistance more than the design value has occurred. Here, the resistance increase determination reference value is a flow velocity reference value for determining abnormality due to an increase in the internal resistance of the ignition plug 17.

In addition, when the internal resistance of the ignition plug 17 increases, the calculated or detected secondary voltage increases. Therefore, the voltage ratio in Expression 9 increases, and the flow velocity calculation values calculated or corrected by the flow velocity calculation unit 132 and the flow rate correction unit 133 also increase. Therefore, in order to determine the increase in the internal resistance of the ignition plug 17, determination of whether or not the calculated flow velocity is larger than expected may be performed. Thus, the resistance increase determination reference value is used in the process of Step S85. The resistance increase determination reference value is obtained by, for example, an experiment or a simulation performed in advance.

In the process of Step S85, when the ignition-plug state determination unit 179 determines that the average flow velocity value is equal to or smaller than the resistance increase determination reference value (False determination of Step S85), the process proceeds to Step S86. In the process of Step S85, when the ignition-plug state determination unit 179 determines that the average flow velocity value is larger than the resistance decrease determination reference value (True determination of Step S85), the process proceeds to Step S87.

In the process of Step S86, the ignition-plug state determination unit 179 sets the resistance decrease flag to False and sets the resistance increase flag to False. That is, the ignition-plug state determination unit 179 determines that no abnormality has occurred in the ignition plug 17. Then, the operation of the ignition-plug state determination unit 179 is completed.

In the process of Step S87, the ignition-plug state determination unit 179 sets the resistance decrease flag to False and sets the resistance increase flag to True. Then, the ignition-plug state determination unit 179 proceeds to the process of Step S89.

In the process of Step S88, the ignition-plug state determination unit 179 sets the resistance decrease flag to True and sets the resistance increase flag to False. Then, the ignition-plug state determination unit 179 proceeds to the process of Step S89.

In the process of Step S89, the ignition-plug state determination unit 179 calculates the correction value $R_{int,\,mod}$ for correcting the design value $R_{int,\,0}$ of the internal resistance of the ignition plug 17 used in the calculation expression (Expression 6) of the internal resistance. The correction value $R_{int,\,mod}$ is calculated by the following Expression 19 using, for example, the average flow velocity $U_{ave\_asm}$, the average flow velocity value $u_{ave}$, the design value $R_{int,\,0}$ of the internal resistance, and the coefficient a of Expression 9 assumed under the current operation condition and the condition of the tumble control valve operation amount.

$$R_{int,mod} = R_{int,0} - \frac{V_{g,0}}{aI_s}(u_{ave\_asm} - u_{ave}) \qquad \text{[Math. 19]}$$

Here, the average flow velocity $u_{ave\_asm}$ assumed under the current operation condition and the condition of the tumble control valve operation amount is calculated by an experiment performed in advance, and is stored in a memory such as the ROM 23b, for example. The average flow velocity $u_{ave\_asm}$ is calculated for each of a plurality of operation conditions and a plurality of tumble control valve operation amounts and stored in advance. Thus, it is possible to easily perform the calculation operation of the correction value $R_{int,\,mod}$.

Here, when the resistance decrease flag is set to True and the abnormality occurs due to a decrease in internal resistance, the average flow velocity value $u_{ave}$ is smaller than the assumed average flow velocity $u_{ave\_asm}$. Therefore, the correction value $R_{int,\,mod}$ calculated by Expression 19 is smaller than the design value $R_{int,\,0}$.

On the other hand, when the resistance increase flag is set to True and the abnormality occurs due to an increase in internal resistance, the average flow velocity value $u_{ave}$ is larger than the assumed average flow velocity $u_{ave\_asm}$. Therefore, the correction value $R_{int,\,mod}$ calculated by Expression 19 is larger than the design value $R_{int,\,0}$.

Then, the ignition-plug state determination unit 179 outputs the calculated correction value $R_{int,\,mod}$ to the inter-gap voltage calculation unit 171. Thus, the operation of the ignition-plug state determination unit 179 is completed. In addition, the inter-gap voltage calculation unit 171 calculates the plug resistance $R_{int}$ using the correction value $R_{int,\ mod}$ calculated by the ignition-plug state determination unit 179, instead of the design value $R_{int,\ 0}$ of the internal resistance of the ignition plug 17. Thus, even when the internal resistance of the ignition plug 17 is damaged, it is possible to secure the flow velocity calculation accuracy.

By determining the state of the internal resistance of the ignition plug 17 by the ignition-plug state determination unit 179, it is possible to determine whether or not an abnormality has occurred in the internal resistance of the ignition plug 17.

Note that the present invention is not limited to the embodiments described above and illustrated in the drawings, and various modifications can be made without departing from the gist of the invention described in the claims.

REFERENCE SIGNS LIST

1 air flow sensor
2 electronically controlled throttle valve
3 intake pressure sensor
4*a* compressor
4*b* turbine
5 variable valve
6 intake pipe
7 intercooler
8 partition wall
8*b* tumble control valve
9 air-fuel ratio sensor
10 three-way catalyst
12 accelerator opening degree sensor
13 injector
14 cylinder
14*a* piston
15 exhaust pipe
16 ignition coil
17 ignition plug
17*a* center electrode
17*b* ground electrode
18 temperature sensor
19 crank angle sensor
20 internal combustion engine control device
21 input circuit
22 input/output port
23*a* CPU
23*b* ROM
23*c* RAM
24, 24B, 24C ignition control unit
25, 177 tumble-control-valve control unit
31, 131, 171 inter-gap voltage calculation unit
32, 132, 172 flow velocity calculation unit
33, 134, 174 flow velocity range calculation unit
34, 135, 175 target output calculation unit
35, 136, 176 operation amount calculation unit
100 internal combustion engine
133, 173 flow velocity correction unit
178 tumble-control-valve state determination unit
179 ignition-plug state determination unit

The invention claimed is:

1. An internal combustion engine control device that controls an internal combustion engine including an ignition plug disposed in a hollow of a cylinder and an ignition coil for applying a voltage to the ignition plug, the internal combustion engine control device comprising:
   an inter-gap voltage calculation unit that calculates a reference inter-gap voltage that is a voltage between gaps of the ignition plug under a reference condition, based on a secondary current generated on a secondary side of the ignition coil and in-cylinder pressure that is pressure in the hollow of the cylinder; and
   a flow velocity calculation unit that calculates a flow velocity of a gas around the ignition plug based on the reference inter-gap voltage.

2. The internal combustion engine control device according to claim 1, wherein
   the inter-gap voltage calculation unit calculates a post-discharge inter-gap voltage based on the secondary current and a secondary voltage generated in the ignition plug, the post-discharge inter-gap voltage being an inter-gap voltage of the ignition plug after a setting time after a start of discharge has elapsed, and
   the flow velocity calculation unit calculates the flow velocity based on the reference inter-gap voltage and the post-discharge inter-gap voltage.

3. The internal combustion engine control device according to claim 2, wherein
   the flow velocity calculation unit
   calculates a voltage ratio between the reference inter-gap voltage and the post-discharge inter-gap voltage, and
   calculates the flow velocity based on the calculated voltage ratio.

4. The internal combustion engine control device according to claim 3, wherein
   the flow velocity calculation unit
   calculates a discharge path length during the setting time after the start of the discharge, based on the voltage ratio, and
   calculates the flow velocity based on the calculated discharge path length.

5. The internal combustion engine control device according to claim 2, wherein the inter-gap voltage calculation unit calculates the post-discharge inter-gap voltage from a difference between a product of resistance connected to the secondary side of the ignition coil and the secondary current, and the secondary voltage.

6. The internal combustion engine control device according to claim 2, wherein the setting time is set from a torque and the number of revolutions of the internal combustion engine.

7. The internal combustion engine control device according to claim 2, wherein the setting time is set based on an average value of the flow velocity calculated by the flow velocity calculation unit and a reference discharge path length set in advance.

8. The internal combustion engine control device according to claim 2, wherein the setting time is set to a time from when the ignition plug starts discharge until re-discharge occurs.

9. The internal combustion engine control device according to claim 1, further comprising:
   a flow velocity range calculation unit that stores the flow velocity calculated by the flow velocity calculation unit for a predetermined number of cycles and calculates the maximum value of a plurality of the stored flow velocities; and
   a target output calculation unit that sets a target output to be output to the ignition coil based on the maximum value of the flow velocities calculated by the flow velocity range calculation unit.

10. The internal combustion engine control device according to claim 9, wherein the flow velocity range calculation unit calculates an average value of the stored flow velocities.

11. The internal combustion engine control device according to claim 1, wherein the reference condition is a shortest discharge condition in which a length of a discharge path is equal to a distance between the gaps of the ignition plug.

12. The internal combustion engine control device according to claim 1, wherein the flow velocity calculated by the flow velocity calculation unit is corrected based on the in-cylinder pressure and gas density in the hollow.

13. The internal combustion engine control device according to claim 10, further comprising
a tumble-control-valve control unit that controls a tumble control valve that adjusts a flow velocity of a gas flowing in the hollow of the cylinder,
wherein the tumble-control-valve control unit sets an operation amount of the tumble control valve based on the average value of the flow velocities calculated by the flow velocity range calculation unit for a predetermined number of cycles.

14. The internal combustion engine control device according to claim 13, further comprising
a tumble-control-valve state determination unit that determines whether or not failure has occurred in the tumble control valve,
wherein, when the operation amount set by the tumble-control-valve control unit is greater than a predetermined value, the tumble-control-valve state determination unit determines whether or not the failure has occurred in the tumble control valve, by comparing the average values of the flow velocities before and after an opening/closing degree of the tumble control valve is changed, to each other.

15. The internal combustion engine control device according to claim 14, further comprising
an ignition-plug state determination unit that determines whether or not failure has occurred in the ignition plug,
wherein the ignition-plug state determination unit determines whether or not the failure has occurred in the ignition plug, based on a determination result of the tumble-control-valve state determination unit and the average value of the flow velocity.

* * * * *